United States Patent
Mowry

(10) Patent No.: US 7,864,211 B2
(45) Date of Patent: Jan. 4, 2011

(54) APPARATUS, SYSTEM AND METHOD FOR INCREASING QUALITY OF DIGITAL IMAGE CAPTURE

(76) Inventor: Craig P. Mowry, 95 S. Main St., Southhampton, NY (US) 11968

(*) Notice: Subject to any disclaimer, the term of this patent is extended or adjusted under 35 U.S.C. 154(b) by 809 days.

(21) Appl. No.: 11/549,937

(22) Filed: Oct. 16, 2006

(65) Prior Publication Data

US 2007/0181686 A1   Aug. 9, 2007

Related U.S. Application Data

(60) Provisional application No. 60/727,538, filed on Oct. 16, 2005, provisional application No. 60/732,347, filed on Oct. 31, 2005, provisional application No. 60/739,142, filed on Nov. 22, 2005, provisional application No. 60/739,881, filed on Nov. 25, 2005, provisional application No. 60/750,912, filed on Dec. 15, 2005.

(51) Int. Cl.
*H04N 3/02* (2006.01)
*H04N 3/08* (2006.01)

(52) U.S. Cl. .................... 348/195; 348/203; 348/205

(58) Field of Classification Search .............. 348/202, 348/203, 205, 206, 224.1, 351; 359/196.1, 359/199.4, 201.1, 210.1–211.4, 230
See application file for complete search history.

(56) References Cited

U.S. PATENT DOCUMENTS

| | | | |
|---|---|---|---|
| 1,912,582 A | 6/1933 | Kelley | 355/77 |
| 2,198,815 A | 4/1940 | Haskin | |
| 4,050,809 A | 9/1977 | Boggs | |
| 4,146,321 A | 3/1979 | Melillo | 396/442 |
| 4,561,054 A | 12/1985 | Andrews et al. | |
| 4,561,745 A | 12/1985 | Kinsman et al. | 396/571 |
| 4,689,696 A | 8/1987 | Plummer | 386/43 |
| 4,710,806 A | 12/1987 | Iwai et al. | 375/240.01 |
| 4,727,425 A | 2/1988 | Mayne et al. | 358/523 |
| 4,756,614 A | 7/1988 | Kato et al. | |
| 4,928,174 A * | 5/1990 | Smith | 348/143 |
| 4,934,821 A | 6/1990 | Morton | |
| 5,117,446 A * | 5/1992 | Haaker et al. | 378/98.3 |
| 5,140,414 A | 8/1992 | Mowry | 348/577 |
| 5,157,484 A | 10/1992 | Pritchard et al. | |
| 5,283,640 A | 2/1994 | Tilton | |

(Continued)

FOREIGN PATENT DOCUMENTS

EP   1 014 112   6/2000

(Continued)

OTHER PUBLICATIONS

Patent Cooperation Treaty, "Notification of Transmittal of the Internaitonal Search Report and the Written Opinion of the International Searching Authority, of the Declaration," International Searching Authority, 2008, 10 pages.

(Continued)

*Primary Examiner*—Lin Ye
*Assistant Examiner*—Euel K Cowan
(74) *Attorney, Agent, or Firm*—Turocy & Watson, LLP

(57) ABSTRACT

An apparatus, system or method for increasing quality of digital image capture is provided. Imaging and, more particularly, capturing visuals to provide image manipulation options are provided to increase resolution of the subject images.

56 Claims, 5 Drawing Sheets

U.S. PATENT DOCUMENTS

| | | | |
|---|---|---|---|
| 5,335,013 A | 8/1994 | Faber | |
| 5,374,954 A | 12/1994 | Mowry | 348/121 |
| 5,406,326 A | 4/1995 | Mowry | 348/121 |
| 5,412,773 A | 5/1995 | Carlucci | |
| 5,457,491 A | 10/1995 | Mowry | 348/104 |
| 5,502,480 A | 3/1996 | Kuga et al. | |
| 5,557,423 A | 9/1996 | Phillips et al. | |
| 5,687,011 A | 11/1997 | Mowry | 358/527 |
| 5,790,086 A | 8/1998 | Zelitt | |
| 5,815,748 A | 9/1998 | Toshihiro et al. | 396/104 |
| 5,889,553 A | 3/1999 | Kino et al. | |
| 5,926,575 A * | 7/1999 | Ohzeki et al. | 382/243 |
| 5,940,641 A | 8/1999 | McIntyre et al. | 396/332 |
| 5,982,350 A | 11/1999 | Hekmatour et al. | |
| 6,014,165 A * | 1/2000 | McIntyre et al. | 348/64 |
| 6,104,840 A * | 8/2000 | Ejiri et al. | 382/284 |
| 6,118,946 A | 9/2000 | Ray et al. | |
| 6,141,051 A * | 10/2000 | Koch et al. | 348/345 |
| 6,143,459 A | 11/2000 | Vizard | 430/139 |
| 6,215,516 B1 | 4/2001 | Ma et al. | |
| 6,252,241 B1 | 6/2001 | Sarussi | |
| 6,323,858 B1 | 11/2001 | Gilbert et al. | |
| 6,396,627 B1 | 5/2002 | Tachihara et al. | |
| 6,414,791 B1 | 7/2002 | Sugawara et al. | |
| 6,512,892 B1 | 1/2003 | Montgomery et al. | |
| 6,553,187 B2 | 4/2003 | Jones | 396/429 |
| 6,587,597 B1 * | 7/2003 | Nakao et al. | 382/284 |
| 6,593,958 B2 | 7/2003 | Kremen | |
| 6,639,625 B1 * | 10/2003 | Ishida et al. | 348/218.1 |
| 6,665,493 B2 | 12/2003 | Miyazaki et al. | 396/408 |
| 6,697,573 B1 | 2/2004 | Adkins | |
| 6,862,140 B2 | 3/2005 | Ogino | |
| 6,900,841 B1 | 5/2005 | Mihara | |
| 6,907,139 B2 | 6/2005 | Yamamoto | |
| 6,913,826 B2 | 7/2005 | Lee et al. | 428/402 |
| 6,929,905 B2 | 8/2005 | Gordon et al. | 430/361 |
| 6,933,962 B2 | 8/2005 | Yamamoto | |
| 6,965,699 B2 | 11/2005 | Jeong et al. | |
| 6,999,110 B2 | 2/2006 | Kobayashi | |
| 7,006,132 B2 | 2/2006 | Pereira et al. | |
| 7,061,532 B2 | 6/2006 | Silverstein | |
| 7,110,025 B1 * | 9/2006 | Loui et al. | 348/220.1 |
| 7,123,287 B2 | 10/2006 | Surman | |
| 7,148,916 B2 | 12/2006 | Fujiwara | |
| 7,164,785 B2 | 1/2007 | Logan et al. | |
| 7,167,191 B2 | 1/2007 | Hull et al. | |
| 7,181,061 B2 | 2/2007 | Kawano et al. | |
| 7,190,389 B1 | 3/2007 | Abe et al. | |
| 7,194,112 B2 | 3/2007 | Chen et al. | |
| 7,389,002 B1 * | 6/2008 | Knight | 382/294 |
| 7,403,224 B2 | 7/2008 | Fuller et al. | |
| 7,417,682 B2 | 8/2008 | Kuwakino et al. | |
| 7,443,447 B2 | 10/2008 | Shirakawa | |
| 7,619,656 B2 | 11/2009 | Ben-Ezra et al. | |
| 2002/0012043 A1 | 1/2002 | Guerin et al. | |
| 2002/0018967 A1 | 2/2002 | Irving et al. | |
| 2002/0057907 A1 | 5/2002 | Kamata et al. | 396/6 |
| 2002/0080261 A1 | 6/2002 | Kitamura et al. | |
| 2002/0113753 A1 | 8/2002 | Sullivan et al. | |
| 2002/0118293 A1 * | 8/2002 | Hori et al. | 348/362 |
| 2003/0202106 A1 | 10/2003 | Kandleinsberger | 348/207.99 |
| 2003/0231255 A1 | 12/2003 | Szajewski et al. | 348/340 |
| 2004/0095357 A1 | 5/2004 | Oh et al. | |
| 2004/0101043 A1 | 5/2004 | Flack et al. | |
| 2004/0119831 A1 | 6/2004 | Miyawaki | |
| 2004/0130649 A1 | 7/2004 | Lee | |
| 2004/0169735 A1 * | 9/2004 | Andersen | 348/219.1 |
| 2004/0223058 A1 * | 11/2004 | Richter et al. | 348/207.1 |
| 2005/0024586 A1 * | 2/2005 | Teiwes et al. | 351/209 |
| 2005/0041117 A1 | 2/2005 | Yamagishi | 348/231.2 |
| 2005/0151838 A1 | 7/2005 | Fujita et al. | 348/39 |
| 2005/0179781 A1 | 8/2005 | Silverbrook | |
| 2005/0185542 A1 * | 8/2005 | Iwase | 369/47.19 |
| 2005/0270387 A1 | 12/2005 | Watanabe et al. | |
| 2006/0050788 A1 * | 3/2006 | Techmer | 375/240.12 |
| 2006/0082906 A1 | 4/2006 | Wang | |
| 2006/0119710 A1 * | 6/2006 | Ben-Ezra et al. | 348/208.99 |
| 2006/0239586 A1 | 10/2006 | Mowry | |
| 2006/0274188 A1 | 12/2006 | Mowry | |
| 2006/0290887 A1 | 12/2006 | Mowry | |
| 2007/0002159 A1 | 1/2007 | Olsen | |
| 2007/0002478 A1 | 1/2007 | Mowry | |
| 2007/0035542 A1 | 2/2007 | Mowry | |
| 2007/0037102 A1 | 2/2007 | Mowry | |
| 2007/0122029 A1 | 5/2007 | Mowry | |
| 2007/0127909 A1 | 6/2007 | Mowry | |
| 2007/0160360 A1 | 7/2007 | Mowry | |
| 2007/0177022 A1 | 8/2007 | Mowry | |
| 2009/0195664 A1 | 8/2009 | Mowry | |

FOREIGN PATENT DOCUMENTS

| | | |
|---|---|---|
| GB | 01073 | 1/1916 |
| GB | 921 706 | 3/1963 |
| GB | 2 072 866 | 10/1981 |
| GB | 2 317 020 | 3/1998 |
| JP | 08-307813 | 11/1996 |
| JP | 09-501275 | 2/1997 |
| JP | 10-023363 | 1/1998 |
| KR | 2008-0086998 | 9/2008 |
| WO | WO 2006/113904 | 10/2006 |
| WO | WO 2006/133133 | 12/2006 |
| WO | WO 2007/002271 | 1/2007 |
| WO | WO 2007/006051 | 1/2007 |
| WO | WO 2007/014153 | 2/2007 |
| WO | WO 2007/014329 | 2/2007 |
| WO | WO 2007/025131 | 3/2007 |
| WO | WO 2007/035193 | 3/2007 |
| WO | WO 2007/062396 | 5/2007 |
| WO | WO 2007/070882 | 6/2007 |

OTHER PUBLICATIONS

"QuickTime VR Authoring Studio," *Apple Computer Inc., U.S.A.*, http://web.archive.org/web/20050329120354/http://manuals.info.apple.com/en/QuickTimeVR_AuthoringStudioUSerManual.pdf, Mar. 29, 2005, pp. 25 and 82.

International Search Report, PCT/US06/24278, Jul. 30, 2007, 3 pages.

PCT Application No. PCT/US2006/015044, International Preliminary Report on Patentability dated Oct. 23, 2007, 5 pages.

PCT Application No. PCT/US2006/021822, International Preliminary Report on Patentability dated Dec. 6, 2007, 5 pages.

PCT Application No. PCT/US2006/024042, International Preliminary Report on Patentability dated Mar. 17, 2009, 6 pages.

PCT Application No. PCT/US2006/024278, International Preliminary Report on Patentability dated Dec. 24, 2007, 7 pages.

PCT Application No. PCT/US2006/026624, International Preliminary Report on Patentability dated Jan. 9, 2008, 5 pages.

PCT Application No. PCT/US2006/028673, International Preliminary Report on Patentability dated Jan. 22, 2008, 9 pages.

PCT Application No. PCT/US2006/015044, International Search Report dated Nov. 22, 2006, 3 pages.

PCT Application No. PCT/US2006/021822, International Search Report dated Aug. 8, 2007, 3 pages.

PCT Application No. PCT/US2006/024042, International Search Report dated Jan. 29, 2008, 3 pages.

PCT Application No. PCT/US2006/026624, International Search Report dated Aug. 8, 2007, 3 pages.

PCT Application No. PCT/US2006/028673, International Search Report dated Dec. 21, 2006, 5 pages.

PCT Application No. PCT/US2006/029407, International Preliminary Report on Patentability dated Jan. 29, 2008, 8 pages.

PCT Application No. PCT/US2006/029407, International Search Report dated Feb. 7, 2007, 6 pages.

PCT Application No. PCT/US2006/033223, International Search Report dated Aug. 29, 2008, 3 pages.
PCT Application No. PCT/US2006/061210, International Preliminary Report on Patentability dated May 27, 2008, 7 pages.
PCT Application No. PCT/US2006/033223, International Preliminary Report on Patentability dated Sep. 23, 2008, 7 pages.
PCT Application No. PCT/US2006/061210, International Search Report dated Oct. 16, 2007, 2 pages.

PCT Application No. PCT/US2006/062193, International Preliminary Report on Patentability dated Jun. 18, 2008, 14 pages.
PCT Application No. PCT/US2006/062193, International Search Report dated Sep. 11, 2007, 7 pages.

* cited by examiner

APPARATUS, SYSTEM AND METHOD FOR INCREASING QUALITY OF DIGITAL IMAGE CAPTURE

CROSS-REFERENCE TO RELATED APPLICATIONS

The present application is based on and claims priority to U.S. Provisional Application Ser. No. 60/727,538, filed on Oct. 16, 2005 and entitled "A METHOD, SYSTEM AND APPARATUS FOR INCREASING QUALITY OF DIGITAL IMAGE CAPTURE," U.S. Provisional Application Ser. No. 60/732,347, filed on Oct. 31, 2005 and entitled "A METHOD, SYSTEM AND APPARATUS FOR INCREASING QUALITY AND EFFICIENCY OF FILM CAPTURE WITHOUT CHANGE OF FILM MAGAZINE POSITION," U.S. Provisional Application Ser. No. 60/739,142, filed on Nov. 22, 2005 and entitled "DUAL FOCUS," U.S. Provisional Application Ser. No. 60/739,881, filed on Nov. 25, 2005 and entitled "SYSTEM AND METHOD FOR VARIABLE KEY FRAME FILM GATE ASSEMBLAGE WITHIN HYBRID CAMERA ENHANCING RESOLUTION WHILE EXPANDING MEDIA EFFICIENCY," U.S. Provisional Application Ser. No. 60/750,912, filed on Dec. 15, 2005 and entitled "A METHOD, SYSTEM AND APPARATUS FOR INCREASING QUALITY AND EFFICIENCY OF (DIGITAL) FILM CAPTURE," the entire contents of which are hereby incorporated by reference.

This application further incorporates by reference in their entirety, U.S. patent application Ser. No. 11/510,091, filed Aug. 25, 2006, entitled: SYSTEM, METHOD APPARATUS FOR CAPTURING AND SCREENING VISUALS FOR MULTI-DIMENSIONAL DISPLAY (ADDITIONAL DISCLOSURE), a U.S. non-provisional application which claims the benefit of U.S. Provisional Application Ser. No. 60/711,345, filed on Aug. 25, 2005 and U.S. Provisional Application Ser. No. 60/710,868, filed on Aug. 25, 2005 and" U.S. Provisional Application Ser. No. 60/712,189, filed on Aug. 29, 2005; U.S. patent application Ser. No. 11/495,933, filed Jul. 27, 2006, entitled: SYSTEM, APPARATUS, AND METHOD FOR CAPTURING AND SCREENING VISUAL IMAGES FOR MULTI-DIMENSIONAL DISPLAY, a U.S. non-provisional application which claims the benefit of U.S. Provisional Application Ser. No. 60/702,910, filed on Jul. 27, 2005; U.S. patent application Ser. No. 11/492,397, filed Jul. 24, 2006, entitled: SYSTEM, APPARATUS, AND METHOD FOR INCREASING MEDIA STORAGE CAPACITY, a U.S. non-provisional application which claims the benefit of U.S. Provisional Application Ser. No. 60/701,424, filed on Jul. 22, 2005; and U.S. patent application Ser. No. 11/472,728, filed Jun. 21, 2006, entitled: A METHOD, SYSTEM AND APPARATUS FOR EXPOSING IMAGES ON BOTH SIDES OF CELLULOID OR OTHER PHOTO SENSITIVE BEARING MATERIAL, a U.S. non-provisional application which claims the benefit of U.S. Provisional Application No. 60/692,502, filed Jun. 21, 2005; the entire contents of which are as if set forth herein in their entirety. This application further incorporates by reference in their entirety, U.S. patent application Ser. No. 11/481,526, filed Jul. 6, 2006, entitled "SYSTEM AND METHOD FOR CAPTURING VISUAL DATA AND NON-VISUAL DATA FOR MULTIDIMENSIONAL IMAGE DISPLAY", U.S. patent application Ser. No. 11/473,570, filed Jun. 22, 2006, entitled "SYSTEM AND METHOD FOR DIGITAL FILM SIMULATION", U.S. patent application Ser. No. 11/472,728, filed Jun. 21, 2006, entitled "SYSTEM AND METHOD FOR INCREASING EFFICIENCY AND QUALITY FOR EXPOSING IMAGES ON CELLULOID OR OTHER PHOTO SENSITIVE MATERIAL", U.S. patent application Ser. No. 11/447,406, entitled "MULTI-DIMENSIONAL IMAGING SYSTEM AND METHOD," filed on Jun. 5, 2006, and U.S. patent application Ser. No. 11/408,389, entitled "SYSTEM AND METHOD TO SIMULATE FILM OR OTHER IMAGING MEDIA" and filed on Apr. 20, 2006, the entire contents of which are as if set forth herein in their entirety.

FIELD

The present invention relates to imaging and, more particularly, to capturing visuals to provide image manipulation options for increasing resolution of subject images and to maximizing the value of each aspect of data that may be captured by an apparatus, system or method for increasing quality of digital image capture. The present invention further relates to a system, apparatus or method for increasing resolution of subject images utilizing an optical assembly for sequentially altering and conveying partial images to one or more image capture zones.

BACKGROUND

An important goal of imaging in the digital age, and before, has been to alter the overall data loads related to captured, stored and/or transmitted images. Digital compression is an industry of it's own dedicated to manipulating data volume without altering imaging result beyond acceptable ranges, typically based on a combination of intended display hardware, anticipated average human visual impression, among other factors. Further a limitation of projects captured electronically, be they for cinema TV or other intended display venues, is their inevitable resolution and available data limit obsolescence as display and imaging technology proceeds to every higher levels of data managing potential and requirement. A need exists in the art for improved systems and methods for maintaining the quality of digital or filmed images while employing the flexibility of digital origination systems to modify and enhance the images. Currently, no system, apparatus or method exists to provide aesthetically superior visuals from a camera or an electronic camera capture module to provide an all digital origination system to enhance the quality of digital image capture. No current system increases the capture capacity of the image digitizing components, but rather uses conventional capture devices to provide a composite key "reference" frame, embodying potentially extreme resolution for use in up-resing a plurality of final images.

SUMMARY

The present invention relates to an apparatus, system or method for increasing quality of digital image capture. Imaging and, more particularly, capturing visuals to provide image manipulation options that can be utilized to increase resolution of the subject images to levels many fold what any conventional capture "chip" or camera can provide.

An electronic camera capture module is provided which comprises a mechanism to vary a position of the module relative to a light stimulus related to a selected visual, wherein the light stimulus affects a selected area at least as large as a light sensitive region of the module in two or more positions the module may assume, wherein the module is further operable to convert the light stimulus representative of a portion of an intended final image to information, the information being of a selected image information output type, and a computer data transforming application to involve at least part of the information to form at least one composite image representative of the intended final image. The module can produce the composite image which embodies as much as a total image information output potential of the module multiplied by a number of image portions captured, relative to any one of the composite images. In one aspect, the computer data transforming application is operable to assemble the composite image as a seamless version of the intended final image, further factoring a secondary data aspect not provided by the module, in modifying the information relative to information of shifting image aspects unavailable within the composite image, the secondary data aspect sampling at least some module positioning aspects of at least some selectively distinguished zones of the composite image portion captures more frequently than information provided by the module. The secondary data aspect can be a second imaging component wherein the light stimulus is selectively provided to the component substantially concurrently as the light stimulus affects the module.

An optical assembly for sequentially altering and conveying partial lens image portions to at least one image capture target zone is provided which comprises a moving optical element whose position is physically shifted as a function of the assembly relative to a light source being conveyed at least in part through the element, the shift in the position resulting in the partial lens image portions being sequentially relayed to at least one image capture target zone, wherein the assembly provides visual information for multiple image captures related to creating a single composite image representative of a single intended final image. In one aspect, the target zone at least in part contains an electronic image capture device operable and situated to receive stimuli relative to the light source related to the partial lens image portions. A data generating component is provided which operates in tandem with the image capture device, and provides information to at least perform subsequent modifications to information related to captures of the partial lens image portions in a computer assemblage of at least one intended final image. The optical assembly is provided which further comprises an image diversion component to relay the lens image to a separate imaging component prior to the lens image passing through the moving optical element, toward a capture representative, at least relative to framing, of the full intended image, of which the partial lens image portions also comprise in tandem, information generated by the separate imaging component at least informing the change in position of selected image aspects, relative to each other, the information generated providing data not provided from captures related to the partial lens image portions.

An electromagnetic radiation refraction assembly is provided for sequentially altering and conveying partial image portions to at least one image capture target zone which comprises, a moving electromagnetic radiation refraction element whose position is physically shifted as a function of said assembly relative to a light source being conveyed at least in part through said element, said shift in said position resulting in said partial electromagnetic radiation refraction assembly partial image portions being sequentially relayed to at least one image capture target zone, wherein said assembly provides visual information for multiple image captures related to creating a single composite image representative of a single intended final image. In one aspect, the element can be a metamaterial, and/or magnetic lens. The refractory element focuses, for example, an electron beam or other particle beam. The radiation source includes, but is not limited to, microwave, infrared, or x-ray. In one aspect, the element is not shifted physically, but is shifted by altering the electromagnetic characteristics of the electromagnetic radiation refraction assembly so that the partial image portions are sequentially relayed to at least one image capture target zone.

The electromagnetic radiation refraction assembly encompasses metamaterial based 'lenses' or any device capable of imaging electromagnetic radiation, for example, electromagnetic frequency spanning from microwaves to visible light to x-rays. The electromagnetic radiation refraction assembly may be used to image radio, infrared or x-ray telescopy.

A computer readable medium is provided which comprises a computer data transforming application to factor at least some of partial captured image information portions to form at least one seamless composite image from the partial captured image information portions initially captured by at least one imaging module. The computer of readable medium can further comprise a data gathering component to capture and store information related to changing positions of selectively distinguished image aspects represented within the partial captured image information portions, the data gathering component sampling at least one aspect of the entirety of an intended full final image more frequently than any one of the portions relayed.

A computer readable medium is provided which comprises a computer data transforming application to factor as least some of a partial captured image information to form at least one seamless composite image from partial captured image information portions initially captured by an electronic capture module, wherein a composite image is further employed by the computer data transforming application in creating subsequent versions of the composite image that may vary from the initially created composite image is modified to create the subsequent versions at least in part through modification instructions provided by secondary information acquired during origination of the partial captured image information.

A camera is provided which comprises an electronic camera capture module operable to vary a position of the module relative to a light stimulus related to a selected visual, wherein the light stimulus affects a selected area internal to the camera at least as large as a light sensitive region of the module in two or more positions the module may assume, wherein the module is operable to convert the light stimulus representative of a portion of an intended final image to information, the information being of a selected image information output type, and a computer data transforming application involves at least part of the information to form at least one composite image representative of the intended final image, which is directly related to the selected visual.

A camera is provided which comprises an optical assembly for affecting a lens image prior to capture wherein a full frame visual intended for a final image is fragmented by at least one moving optical element, the element operable to convey selected portions of the visual to at least one capture device within the camera, sequentially, the device receiving at least information related to the entirety of the full frame visual as embodied within the portions. The camera can further include a secondary data capture component operable to sample and provide at least electronic information related to the shifting in position of selectively distinguished image aspects related to the full frame visual for use in affecting aspects of a composite image created from the portions as captured, toward creating a selective number of modified subsequent final images to occur between available captured composite images generated by captures of the portions by the camera. In one aspect, the camera further comprises a computer data transforming application involves at least part of the information to form at least one composite image representative of the intended final image, which is directly related to the selected visual.

A system is provided which comprises a hybrid camera having two components for generating distinct data outputs related to visual information derived from a single, shared light source, a position variable image capture module, operable to sequentially capture distinct portions of an intended final image, and a data transform operable on a computer to at least factor image data generated by the image capture module in creating composite images from a plurality of captures of the module of the distinct portions.

In one aspect, a system is provided which comprises a hybrid camera having two components for generating distinct data outputs related to visual information derived from a single, shared light source, at least one position variable optical component, operable to sequentially relay distinct portions of the visual information derived from the light source to at least one light sensitive image capturing component, and a data transform operable on a computer to at least factor image data generated by the module in creating composite images from a plurality of captures of the module of the distinct portions.

In another aspect, a system is provided which comprises a hybrid camera providing two components for generating distinct data outputs related to visual information derived from a single, shared light source, at least one position variable optical component, operable to sequentially relay distinct portions of the visual information derived from the light source to at least one light sensitive image capturing component, and a selectively position variable image capture module, operable to sequentially capture distinct portions of an intended final image selectively in tandem with the visual information as relayed by the optical component, and a data transform operable on a computer to at least factor image data generated by the module in creating composite images from a plurality of captures of the module of the distinct portions.

A method for capturing full frame high resolution images is provided which comprises varying a position of an electronic camera capture module relative to a light stimulus related to a selected visual, wherein the light stimulus affects a selected area at least as large as a light sensitive region of the module in two or more positions the module may assume, converting the light stimulus representative of a portion of an intended final image to information, the information being of a selected image information output type, and analyzing at least part of the information with a computer data transforming application to form at least one composite image representative of the intended final image. In one aspect, the composite image embodies as much as the total image information output potential of the module multiplied by the number of image portions captured, relative to any one of the composite images. The method can further comprise assembling with the application the composite image as a seamless version of the intended final image, further factoring a secondary data aspect not provided by the module, in modifying the information relative to information of shifting image aspects unavailable within the composite image, the secondary data aspect sampling at least some module positioning aspects of at least some selectively distinguished zones of the composite image portion captures more frequently than information provided by the module

BRIEF DESCRIPTION OF THE DRAWINGS

For the purpose of illustrating the invention, it being understood, that the invention is not limited to the precise arrangements and instrumentalities shown. The features and advantages of the present invention will become apparent from the following description of the invention that refers to the accompanying drawings, in which.

DETAILED DESCRIPTION

Figure 1:
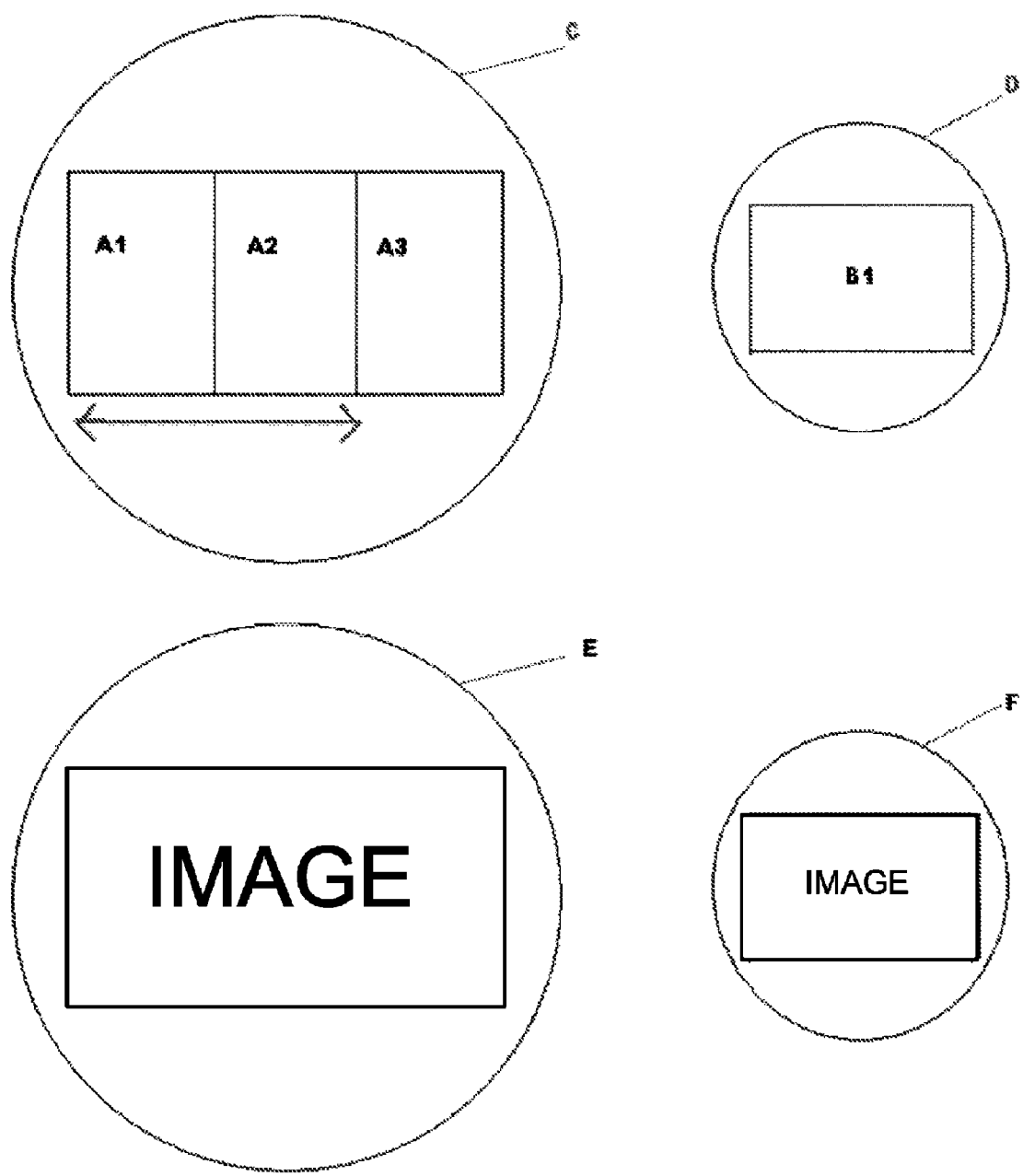
FIG. 1 shows an embodiment of a hybrid imaging system configuration of the present invention.

The present invention strives to maximize the value of each aspect of data that may be captured by an apparatus, system or method for increasing quality of digital image capture. The apparatus, system or method of the present invention can reduce unnecessary large data stores used for perhaps a fraction of their entirety and can expand options related to existing ancillary camera systems. Embodiments of the present invention provide a new range of functionality to camera systems thus not necessarily requiring major reconfigurations of familiar camera designs.

An approach in the present invention to capturing significantly less overall image data per "second," for example, though providing a single image per second (for example) capable of imparting resolution to a plurality of subsequent images captured sequentially in relation to this higher resolution "key frame" allows for a sort of "anti-compression." Typically large data volumes are captured, with most discarded in later "compression" medications to the image data. Herein, image data provides the actual critical information toward 24 fps of image data with quality perhaps many fold beyond any current imaging systems' display capacity. Thus, upresing to the ever growing display capacities of cinema and home display is an option, potentially years, by way of the present invention by virtue of extremely high res composite key frames, e.g., a single image captured in segments over time, as informed by full frame captures such as the familiar video-assist material of cinema, a video adjunct capture through the cinema lens for exact framing reference, or as informed by other full frame image aspect positioning reference sampling means. For example, as the flower blows from left to right during that one second of capture time, the 24 full frame captures provide the necessary "wire frame" information related to the shifting position of the flower buds, in order to reposition the vastly higher amount of data in the "key frame" related to those 24 full frame captures, wherein the same bud occurs as represented by 24 times the resolution and/or amount of data captured; the entire imaging component, such as a data chip, decided to capturing just that bud, which was only 1/24 of the overall full frame image, for example, before moving on to capture the next 1/24 of the picture determined in the repeating, sequential key frame "mosaic/composite" capture process.

The present invention relates to an apparatus, system or method for increasing quality of digital image capture. Imaging and, more particularly, capturing visuals to provide image manipulation options can be utilized to increase resolution of the subject images. An electronic camera capture module is provided which comprises a mechanism to vary a position of the module relative to a light stimulus related to a selected visual, wherein the light stimulus affects a selected area at least as large as a light sensitive region of the module in two or more positions the module may assume, wherein the module is further operable to convert the light stimulus representative of a portion of an intended final image to information, the information being of a selected image information output type, and a computer data transforming application to involve at least part of the information to form at least one composite image representative of the intended final image. An optical assembly for sequentially altering and conveying partial lens image portions to at least one image capture target zone is provided which comprises a moving optical element whose position is physically shifted as a function of the assembly relative to a light source being conveyed at least in part through the element, the shift in the position resulting in the partial lens image portions being sequentially relayed to at least one image capture target zone, wherein the assembly provides visual information for multiple image captures related to creating a single composite image representative of a single intended final image. A method for capturing full frame high resolution images is provided which comprises varying a position of an electronic camera capture module relative to a light stimulus related to a selected visual, wherein the light stimulus affects a selected area at least as large as a light sensitive region of the module in two or more positions the module may assume, converting the light stimulus representative of a portion of an intended final image to information, the information being of a selected image information output type, and analyzing at least part of the information with a computer data transforming application to form at least one composite image representative of the intended final image.

A camera is provided which comprises an optical assembly for affecting a lens image prior to capture wherein a full frame visual intended for a final image is fragmented by at least one moving optical element, the element operable to convey selected portions of the visual to at least one capture device within the camera, sequentially, the device receiving at least information related to the entirety of the full frame visual as embodied within the portions.

An electromagnetic radiation refraction assembly is provided for sequentially altering and conveying partial image portions to at least one image capture target zone which comprises, a moving electromagnetic radiation refraction element whose position is physically shifted as a function of said assembly relative to a light source being conveyed at least in part through said element, said shift in said position resulting in said partial electromagnetic radiation refraction assembly partial image portions being sequentially relayed to at least one image capture target zone, wherein said assembly provides visual information for multiple image captures related to creating a single composite image representative of a single intended final image. In one aspect, the element can be a metamaterial, and/or magnetic lens. The refractory element focuses, for example, an electron beam or other particle beam. The radiation source includes, but is not limited to, microwave, infrared, or x-ray. In one aspect, the element is not shifted physically, but is shifted by altering the electromagnetic characteristics of the electromagnetic radiation refraction assembly so that the partial image portions are sequentially relayed to at least one image capture target zone.

The electromagnetic radiation refraction assembly encompasses metamaterial based 'lenses' or any device capable of imaging electromagnetic radiation, for example, electromagnetic frequency spanning from microwaves to visible light to x-rays. The electromagnetic radiation refraction assembly may be used to image radio, infrared or x-ray telescopy.

It is to be understood that this invention is not limited to particular methods, apparatus or systems, which can, of course, vary. It is also to be understood that the terminology used herein is for the purpose of describing particular embodiments only, and is not intended to be limiting. As used in this specification and the appended claims, the singular forms "a", "an" and "the" include plural references unless the content clearly dictates otherwise. Thus, for example, reference to "a container" includes a combination of two or more containers, and the like.

The term "about" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

Unless defined otherwise, all technical and scientific terms or terms of art used herein have the same meaning as commonly understood by one of ordinary skill in the art to which the invention pertains. Although any methods or materials similar or equivalent to those described herein can be used in the practice of the present invention, the methods or materials are described herein. In describing and claiming the present invention, the following terminology will be used. As used herein, the term, "module" refers, generally, to one or more discrete components that contribute to the effectiveness of the present invention. Modules can operate or, alternatively, depend upon one or more other modules in order to function.

"Composite image" refers to an image representative of an overall desired visual, comprised of distinct smaller images that when assembled in a specific sequence, recreate a version of the desired visual embodying potentially unique attributes of the compositing process, such as the present invention's resolution boosting result to intended final images derived from a composite image.

"Intended final image" refers to a system, method or component user's aesthetic choice, or photographic "framing" of the intended portion of a camera image for subsequent finalization and display, also known as the "live area" of a captured image.

"Image capture zone" refers to the plane or other area(s) within a camera where light entering the camera, embodying desired image information, is relayed and/or focused. This area is typically of a smaller or larger size depending on the size and/or capture potential of the capture device(s.) Herein, as capture device(s) are moving to acquire multiple captures related to a portions of a larger image, the image capture target zone may be potentially quite large affecting the overall lensing and/or image acquiring hardware.

"Lens image" refers to any image or light stimulus, for example, images provided by lenses or other light delivery means existing or that will come to be in exposing image receptive media and elements to light or other stimuli that are the focus of rendering displayable final images.

"Light sensitive region of an electronic camera capture module" refers to the actual light sampling plane or otherwise configured surface of a CCD device, e.g., camera capture chips, or other configurations of electronically powered, light reactive sampling devices. The desired final image must at least be trained to occur clearly within the light sampling zone of such chips and image receptive devices, in order to allow for final information to be generated to allow for this particular framing/composition of the selected visual to be properly displayed on intended display systems.

"Computer data transforming application" refers to software created specifically to impose selected predetermined modifications/transformations to data based on selected criteria and often at least one additional data stream. Herein, the application at least involves image data related to images that the application is operable to seamlessly composite into the proper "mosaic" or puzzle version of the overall visual. Further, a configuration herein involves ancillary data informing adjustments to such a mosaic or composite image created, to allow it to provide a plurality of additional final images embodying attributes of the very data rich composite image and more current image aspect positioning data provided by the ancillary data, collected in cooperation and for this purpose (at least in part) during capture of the composite image portions.

"Image portion captures" or "image portions captured" refers to the sequential fragmentation of an overall image into selectively enlarged and offset "pieces" for relaying to a capture device(s) that will over time capture individually each of these image portions for subsequent recreation as a single composited image, each portion similar to a single tile in a mosaic floor design.

"Key frame" refers to an image or "frame" of image information, for example, digital data, that is used to affect and/or extrapolate subsequent final images with, or without the use of other information acquired during capture of information contributing to that key frame. Animation has been known to use key frames to infer subsequent frames between key frames, to minimize the number of overall labor intensive (once hand made) key frames. Herein, key frames are the composited images, and the subsequent frames derived from key frames are modified, changes at least in part informed in a further embodiment by a second data store acquired at the time of composite/key frame image capture; specifically to provide information related to positioning of image details that shift but are not recorded by the composite frame capture system, as while one portion is being captured another portion's image details have shifted, yet not been recorded by that capture device. Thus, a secondary device may provide such critical data to inform seamless final images, each with the full resolution of the original key frame, or may provide data for additional properties.

"Full frame captures" refers to one capture device designed to generate information from portions of a larger image, sequentially. That larger image, or intended final image is the framing and/or composition of a visual desired for eventual display. The configuration herein of a second image capture device working in tandem with an image portions capture assembly within the same camera, receives diverted light from the same camera lens (preferably) and captures that visual as a single image capture reflecting the entirety of the intended full final visual, or "live area" of the image the user intends to display. Once the image portion captures are reassembled into composite key frames, they too should reflect this selected image framing result.

Camera, Apparatus and System to Maximize Image Data

The present invention strives to maximize the value of each aspect of data that may be captured, reducing unnecessary large data stores used for perhaps a fraction of their entirety, and expanding options related to even existing ancillary camera systems, providing a new range of functionality to camera systems thus not necessarily requiring major reconfigurations of familiar camera designs.

The following examples and embodiments demonstrates the current configuration based on screening means, capture devices, and ancillary technology.

A scene of a sunset is being captured by a hybrid camera configuration of the present invention. The scene is captured initially by a conventional, or nearly unaltered high definition camera lens, such as those found on the SONY CINE ALTA systems.

The lens light is conveyed through focusing and zooming options before encountering a mirror of intermittent or continual, optional design, diverting the lens image in part, to a capture device offset from the lens image passing through the initial capture lens. This capture device functions for this digital camera also as a video-assist, as the second capture element the lens image will encounter will not capture a full frame version of the intended final image, thus this offset device will fulfill that essential function for the operator as well. This device captures 24 digital images per second of the full frame intended final image. In a still camera configuration, this element if present might capture a single full frame image for use in correcting image portion captures' aspects positionally to more correctly reflect that single instant or "click" of the camera; despite the fact that portion captures may have occurred over an entire second of time, before during or after the "click" for example.

The lens image, or remaining portion of it if a literal portion of it is continually diverted to that initial capture device, continues it's path to encounter a moving optical element, in this instance, an enlarging, e.g., magnifying lens or lens array. As this element enlarges the lens image prior to capture, in essence, "zooming in to it," this may be a fixed effect or a selective and/or variable option, likely thus involving a lens array.

Should the degree of magnification be variable by the operator, this indicates a configuration where the operator may capture images based on the desired final maximum resolution and/or image data volume the operator desires. The more extreme the focal "zoom in," the more portions of the lens image must be individually captured to cover the essential intended final image framed area. The side effect being, in part, that the composite or "mosaic" image potential resulting from all of these captures will provide a composited key frame of potentially enormous individual image information volume, and the potential benefits that typically follow, likely including resolution.

For the present configuration, the operator has chosen to "triple" the camera resolution beyond the maximum capture potential of his 2 k camera capture chip(s) by selecting the composite "triptych" camera setting. Demonstrating the versatility of moving components, such a setting of 3 or 4 portion captures, to achieve the image ratio of the intended display ratio(s) herein the camera chip(s) having the rectangular shape, for example, similar to the plasma displays, is repositioned by the camera in response to this capture choice, to turn 90 degrees, to receive an enlarged version of the lens image as three distinct vertical captures, covering the visual like pans of a screen, left to right to left to right, or some variation thereof. Though, in this camera configuration, the optics provide the variation in image "portion" to this image receptive "chip", or device, allowing the optics to affect the variation on the image size, avoiding the need for a larger overall full image manifest on a larger target zone to be covered by a moving chip, or image digitizing device, which would present camera size and optic component challenges that would likely render this stage of the process preferably and optics component task more preferably.

Thus, over one second in time, this vertically positioned, rectangular image receptive, e.g., light reactive, digitizing chip will receive three distinct, static images from the optic array to capture. Thus, these components are timed and linked and managed by the camera system to function in tandem to render the desired settings result.

The moving optical array that is relaying the enlarged and typically offset portions of the lens image to this static capture elements/chip(s) thus will move intermittently three times, providing the motionless period for the chip to sample and generate digital data representative of the visual stimulus. Then, repositioning and the next "panel" of the triptych is relayed for individual digitization.

Throughout this one second of time, in which only three images are being captured by this imaging element, the other image capture aspect offset from the lens image has dutifully digitized and relayed for recording 24 full frame captures of the desired final image as captured by the lens. These images are also serving instantly as the camera user's full frame camera reference and may later serve as initial editing images prior to final image modifications involving the triptych "key frame" composite images generated by the other image capture device.

A time code generator provides discreet linking data between the cooperative, interdependent images generated by the separate image capture devices, which are preferably embodied within the same camera housing. As post production modifications will look to the full frame captures at least (and primarily) for position shifting data, similar to "wire frame" data, of image aspects throughout the 24 frames captured in a second, it is key to mention that such data may be sampled by other devices other than image capture devices. Further them need not be necessarily a part of the "camera" but and aspect of the multi-data capture, compositing "system."

Herein, the net result of the capture, (with regards to one second of time, is 27 images of 2 k resolution each, as each of the image capture devices in this version is a 2 k chip capture component, chips it is a 3 chip component. These time-coded images are thus clearly distinguished in storage, relative to all aspects unique to each, e.g., time recorded, portion of the "triptych" composite.

After editing has completed on the 2 k full frame material captured at 24 fps, for example, 40 hours of footage is now one hour of final desired footage. A computer managing software, e.g., an image data transform program, unique to this invention, is then provided with access to all images captured. Distinguishing the one hour of footage from the rest, the program operates on the computer to "load" the composite key frames related to every second of footage within that one selected hour of edited-down footage.

The computer then performs the compositing process on all key frames, as a function of the transform, eliminating and overlap between sections of each "triptych" and assembling a seamless composite indistinguishable from the full frame captures with regards to framing. However, there are difference. One major difference being that the computer has maintained the key frames as 6 k images, maintaining all information from each 2 k capture of the "triptychs."

As a second operation of the transform, the full frame captures related to each key frame, one key frame per second herein, and reduces them to wire frame data. This data outlines, according to system provided parameters preferably and aspect of the transform program operating, selected visible image aspects, such as sky, flower petal, uniform section of grass, with a selectable degree of detail and discretion.

Now armed with the actual record of how these elements shifted position during the time the key frame was generated, and not recording such data, the computer imposes these changes in position to every image aspect of the key frame to then create the subsequent 23 frames of information maintaining the 6 k data threshold for each of those 23 as well. This "anti-compression" transform would have selectable options for dealing with choices related to identifying revealed image aspects not recorded within the key frame, though all are aesthetically manageable and visually seamless results are indeed feasible with 24 frames of 2 k images per second also available. For example, lower res moments of such smaller objects within the overall image would likely be undetectable, amidst the larger overall image wherein the benefit of carrying over the full data of the key frame to image aspects is not an issue or mystery.

The benefit being that this simple configuration example of triple resolution boosting only hints at the potential of 24 portion key frame capture cameras, providing 48 k key frames from cameras utilizing only 2 k standard capture devices. For example, as theatrical screens advance to every higher clarity and data managing potential, STAR WARS 1 was shot at the time very high tech on 2 k, will become less desirable to screen on systems capable of providing fully 6 k images to audiences.

Thus, without readily available 6 k, or in further embodiments, 48 k capture systems, herein present capture devices configured as disclosed, may allow television and film projects to get "in the can" the key frame data necessary for their project to be "re-resed" and made compatible with every improving display systems, simply by returning to the source (captured) images. It is all in the composite images.

Further, as news channels and virtually all TV turns to high definition, it is clearly an advantage to be able to capture and transmit over costly satellites 24 lower res and an additional 4 lower res digital images per second, for CNN in Atlanta to "re-res" to high definition by compositing the 4 to create the key frame for re-resing the other 24. In essence, transmitting far less data than conventionally done to achieve higher resolution broadcast material, may result in footage that has image data "in the can" beyond any current high definition hardware available; the footage is "future ready."

For cinema, such future readiness and expandable resolution capability of project shot and screened at the highest levels today, ready for the highest levels available in 20 years, for example, are immediately more valuable. Not unlike having a digital record of the color information lost on films shot in black and white, in the 20's, allowing accurate and true recreation of the color scenes.

FIG. 1 illustrates a hybrid imaging system embodiment of the present invention. A conventionally placed electronic imaging element, such as a CCD, hereafter this element will be called the "chip(s)") may be selectively (and not essentially) repositioned, 90 degrees, A1. Thus the rectangular dimension of the capture device, typically relaying information for a 1:65 to 1 dimension monitor display, may provide a similar 1:65 dimension coverage in a different way, as illustrated by A1, A2 and A3 when factored collectively as a single imaging plane within a larger lens image target area than is conventionally provide for such a chip(s).

The vertically positioned CCD, or other light sensitive electronic imaging device positioned typically in line with a lens image, when "moved" left to right, continually or intermittently, though any motion allowing for clean capture of a new portion of lens image C is primary, e.g., from A1 position to A2 and then A3. After repositioning, the chip(s) will cover at least the 1:65 to 1 when moved from one side to the other, (left to right, or vice versa,) a three-stop coverage of a larger lens image area may allow for a single chip (or array of 3 chips, if color is fragmented) to provide as few image captures as the operator may desire within a single second of time; in this example, three in one second. As few or as many separate image "portion" captures may be acquired within configurations of this system, the more captures made creating a more fragmented "mosaic" or puzzle version of the lens image and also providing potentially more image data for an ever more highly resolved "composite" or mosaic key frame, which may be assembled from the distinct image portion captures under functions of the present invention.

During the three-stop capture of a lens image that is large enough to cover the entire zone through which the chip(s) or other capture element(s) will move, a secondary function of the hybrid system is to capture a more frequent sampling of position information of aspects within the lens image, as they shift during that second of time.

In a further embodiment, capture a sampling of position information over time is accomplished with a second imaging device, B1, receiving a portion or all of the same lens image, either continually or intermittently; during the second of time the other capture device is moving and capturing "portions" of the lens image, on a second imaging plane. This diversion of the lens image to another imaging element to capture the entirety of the image area being also sampled and converted to electronic data/signals by the moving imaging element, provides a constant (24 fps for example) record of the entire desired framed image for at least "positioning" information related to image aspects as they shift potentially, during those 24 frames captured in a second of time.

Several goals are accomplished by way of the moving chip configurations potential of the present invention. Video cameras, including digital cameras, either still or for entertainment imaging, may employ capture elements of conventional resolution potential in providing image information resulting in final images with resolution potentially many fold beyond any known stationary chip imaging devices available. For news organizations, for example, as their video camera captures relatively simultaneously a full frame video capture 24 times per second, the "mosaic" or moving CCD assembly of the camera herein may provide (as with this example) only three additional images for storage and relay, via satellite if in the field, in resulting in 24 final images per second with nearly three times the image information each, as any one of the 24 initial full frame image captures; factoring potential overlap between the mosaic image portion captures and considering the chips all have the same resolution potential, (2 k for example.)

E and F demonstrate the different sizes of the lens image versions relayed to the different imaging planes within the camera, wherein distinct imaging elements (chips) A and B capture the same visual; one as full frame captures and the other capturing three portions of the visual, moving to do so, resulting in all the information for program implemented by an image data managing computer to reassemble a seamless final version of the visual, e.g., sunset, with as much as three times the image information as a single full frame capture affected by B1, given A and B being identical chip/imaging element types. FIG. 1 illustrates that the mosaic capture is affected by a chip with double the data capture means of the full frame imaging chip, and demonstrates that the resolution of the full frame imaging chip capturing the "positioning" data, as discussed below, need not be comparable to the one involved in capturing the series of partial image captures. The partial image captures are responsible for the true final resolution of all final images provided by way of this invention.

It is important to say that the hybrid camera, with secondary full-frame capture of 24 fps data may be affected by non-imaging data sampling means; as long as a continual discreet record of elements being photographed and any change of position they incur during a selected number of samplings over a single second of time. For example, a signal transmission and receiving sampling device, resulting in even a wire-frame representation of the lens image and/or scene captured by the lens (or other imaging means) would be an example of a potential replacement of the second imaging unit (full frame,) providing all of the data necessary to affect final images and working in tandem with the partial image captures to provide data necessary for subsequent computer assemblage of those final images.

Figure 2:
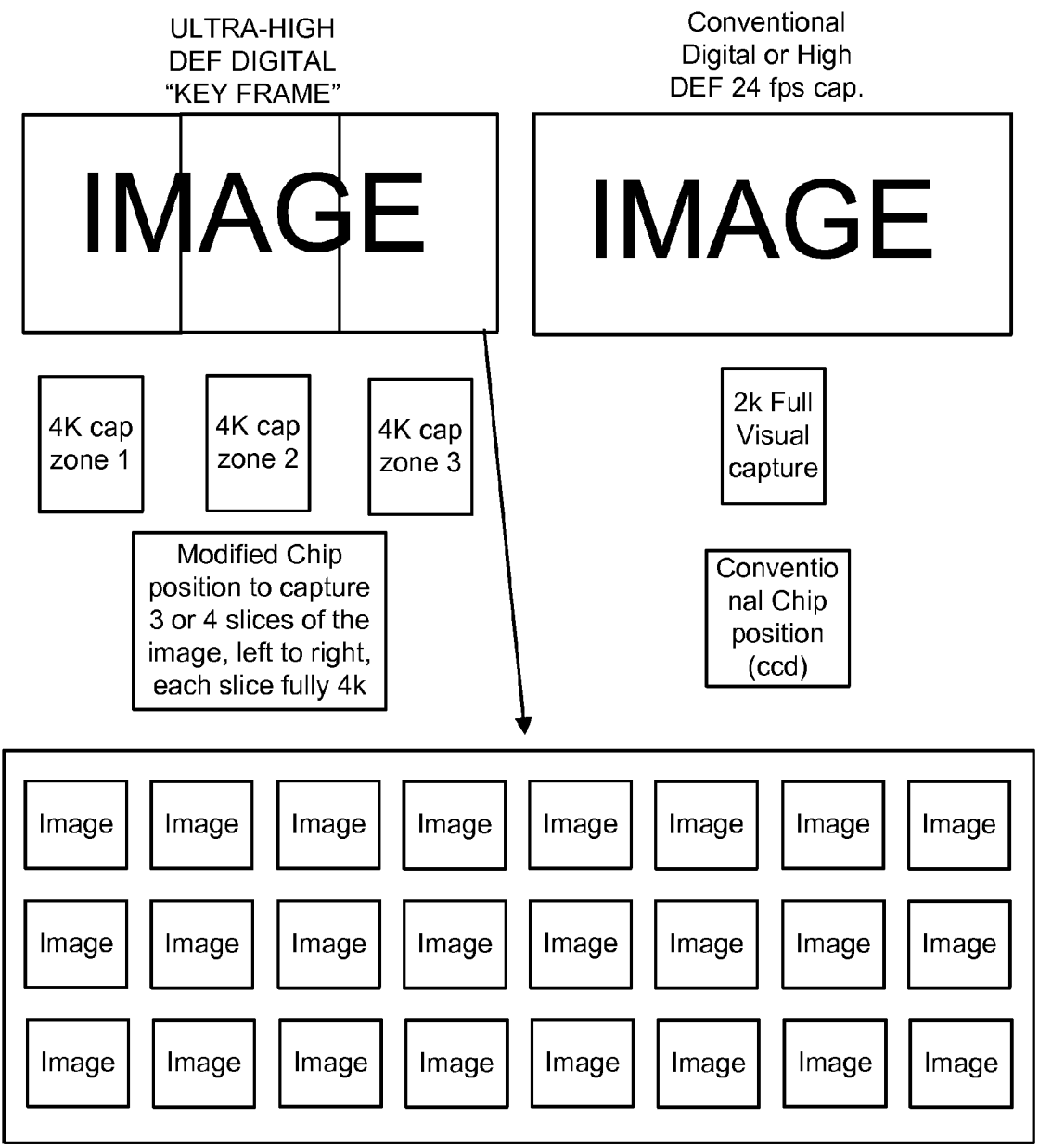
FIG. 2 shows an embodiment of a hybrid imaging system configuration of the present invention.

FIG. 2 shows a hybrid imaging system configuration as an embodiment of the present invention. As the conventional 24 fps captures provide the "wire frame" image aspect position data, the richer Key Frame data, by image zone, can replace image data in every one of the 24 images with exactness, resulting in 24 images each with up to 12K data. These images are indistinguishable from images of the same scene from a hypothetical camera, not yet in existence, with a 12 k image capture capacity.

Figure 3:
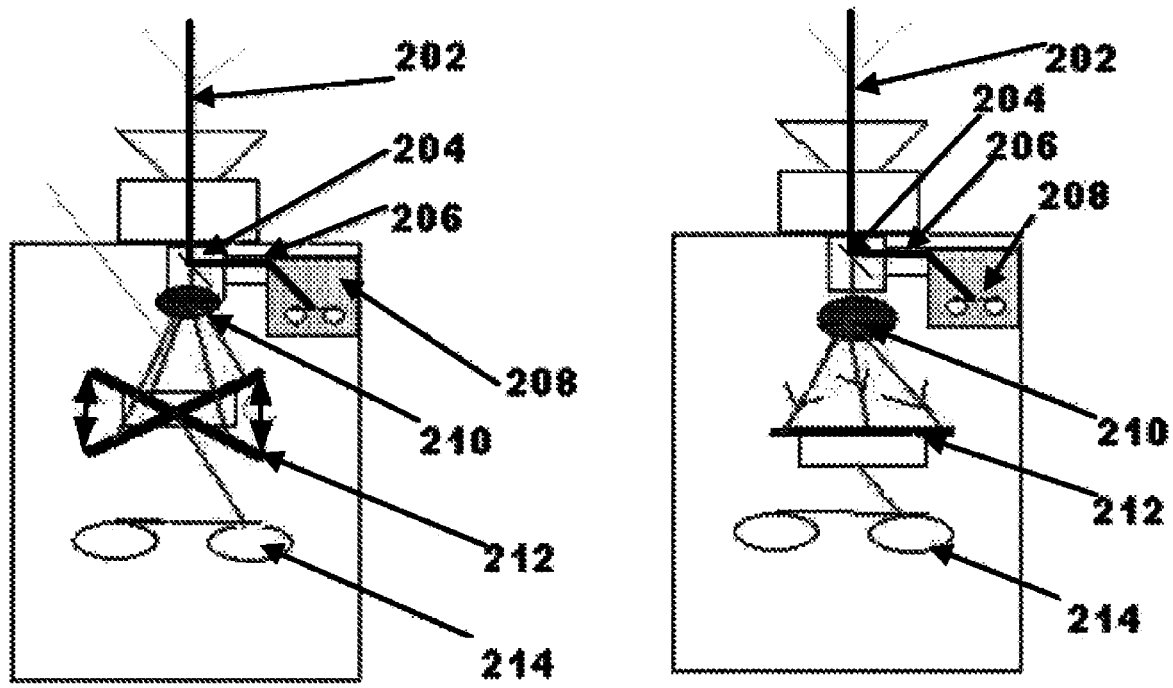
FIG. 3 shows the moving and static configuration potential of the electronic imaging element.

FIG. 3 illustrates the moving and static configuration potential of the electronic imaging element, such as a CCD, and optic element, such as lenses/mirrors, to achieve the mosaic key frame capture and store the result.

Lens image, 202 enters the hybrid (full frame/partial frame capture system) camera, encountering image diversion component 204, e.g., mirror/prism or other aspect. Full frame capture element 206 captures and relays for storage the full frame image data, to storage means/component 208, e.g., drive, tape or other.

Optic array 210 relays the selected portion of lens image 202 to partial/mosaic image capture component 212, which may be static or move in a selected direction or directions in order to function in tandem with image portion relaying component 210 to cover the selected number of image portions to form the desired mosaic key frame image result. The present example of the motion potential these components is not limiting, as they may move even in complete circular motions potentially, in a configuration, in relaying and capturing the cycle of image portions representing the full frame image captured distinctly 206.

Once again, the entire 206/208 assembly, potentially similar to a "video assist" aspect of a camera, may be replaced potentially by a different data sampling means working in tandem with the captures affected by 212 and stored by drive/tape or other storage means 214. Therein, as long as a proper record of image aspects' shifting during a selected duration affects final images assembled from key frames (created from data captured sequentially by 212) provides the seamless aesthetic result, e.g., of 24 fps of fluid video with the data thresholds of the full key frames.

Figure 4:
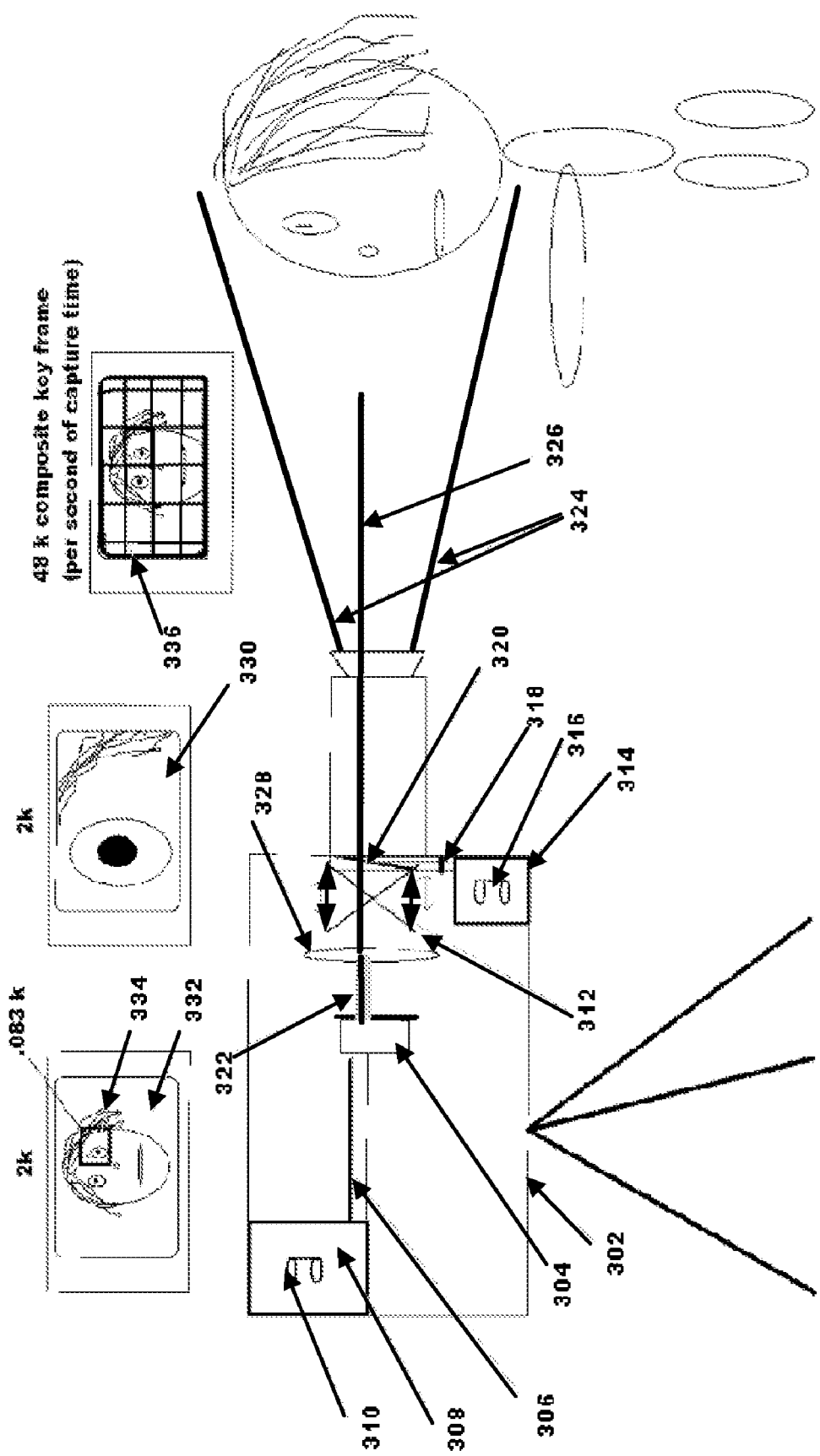
FIG. 4 shows a camera configuration of the mosaic capture function as an embodiment of the present invention.

FIG. 4 illustrates another camera configuration of the mosaic capture function as an embodiment of the present invention. Herein camera 302 is delivering lens image 324 to two distinct imaging elements, 304 and 318, for example, CCD imaging devices. Lens image diversion means, 320, for example, a mirror, delivers the full intended framed image, represented on monitor 332, to imaging element 318 for storage on drive, tape 316 or other image data storage component, 314.

Optical element(s) 312 and/or 328 represent both a magnifying of lens image portion 326, into relayed lens image portion 322, represented on monitor 330, and a preferably intermittent shifting of the portion of the lens image being delivered to the now static imaging element, such as CCD, 304. Herein 24 distinct portions of the lens image 324 are captured by element 304 within a single second of time, relayed 306 to image data storage component 308, which is a drive, tape 310 or other image storage means.

As imaging component 318 captures 24 full frame images of the entire desired lens image, 324, a program distinct to this invention operable by a computer reassembles the image portions stored by 308, in essence reconstructing the puzzle of the lens image, as seen on monitor image 336. The benefit herein being, that as optical elements 328 and/or 312 complete their "sweep" of the image area to deliver the 24 distinct, clean image-portion captures to imaging device 304 Imaging device 304 has in fact captured a mosaic "key frame" with as much as 48 k data, e.g., if 304 is a 2 k capacity imaging chip.

Thus, informed by the "wire frame," or changing positioning of the elements within the overall image, recorded as full frame data by 24 fps capture store 314/316, the program can create 24 fps final image data that applies the potentially 48 k data, in this example, to each and every of the 24 final images, allowing for enormously data rich final images; by using a single image per second, for example, to provide resolution and 24 frames per second of standard resolution captures to provide the positioning data for shifting elements captured within lens image 324.

Again, the ancillary capture aspect, 314/316, may be as simple as a "video tap" adjunct, to the camera. However, this image aspects' positioning data may be captured as literal image data or as wire frame data acquired through a non-imaging sampling means, radar, sonar, and other send/receive systems for collecting position data within a selected area, are some examples.

So, just as a "zoomed in" still camera with 5 megapixel capture means, still captures that much data even if it is zoomed in to a portion of the lens image, optically, the present invention allows for several of such "zoomed in" portions of the overall lens image to be assembled to create a tandem visual; if 4 portions of the image are captured thus, a final still image of up to 20 megapixels is the result. In a still camera configuration, a single full frame capture may be followed by a quick series of image portions affected by shifting optics, to provide the image portions to be "pasted" into the proper position, represented by the single instant taken by the one full frame visual/capture; which preferably occurred just prior to the image portion captures, if not during.

The computer program of the present invention, as operated on an image data managing computer, factors potential overlap within the mosaic/composite captures and seamlessly recreates a full frame visual, of the lens image with several times the resolution (and data threshold) of any single capture affected by the chip(s). Further the computer and program manage data provided by the "image aspects' positioning data samples," preferably secondary full frame captures of the lens image, to allocate the highly resolved composite key frame data over 24 final images, shifting the highly resolved elements of that key frame image based on true image information informing such element's shifting positions, provide by the full frame captures, or other positioning sampling means working in tandem with the mosaic image capture aspect(s) of the camera.

The advantage to optical elements, or other image diversion means, delivering the subject image, or light, to the capture element for mosaic capture, is that the target area for the light (in this example the light of the lens image) need not be enlarged relative to what is normal. Herein, the stationary chip(s) receive the conventional lens image coverage, with the "shift" in what aspect of the lens image being conveyed to that chip(s) being affected/altered optically until all portions of the image comprising the desired mosaic image, (be it 3 portions or 24,) are covered and recorded. The present example provides one complete mosaic/composite key frame every second, as the secondary capture element provides 24 frames of full frame information. However, the frequency of each key frame being generated relative to samplings of image aspects' shifting positions within the frame, is entirely selective.

Figure 5:
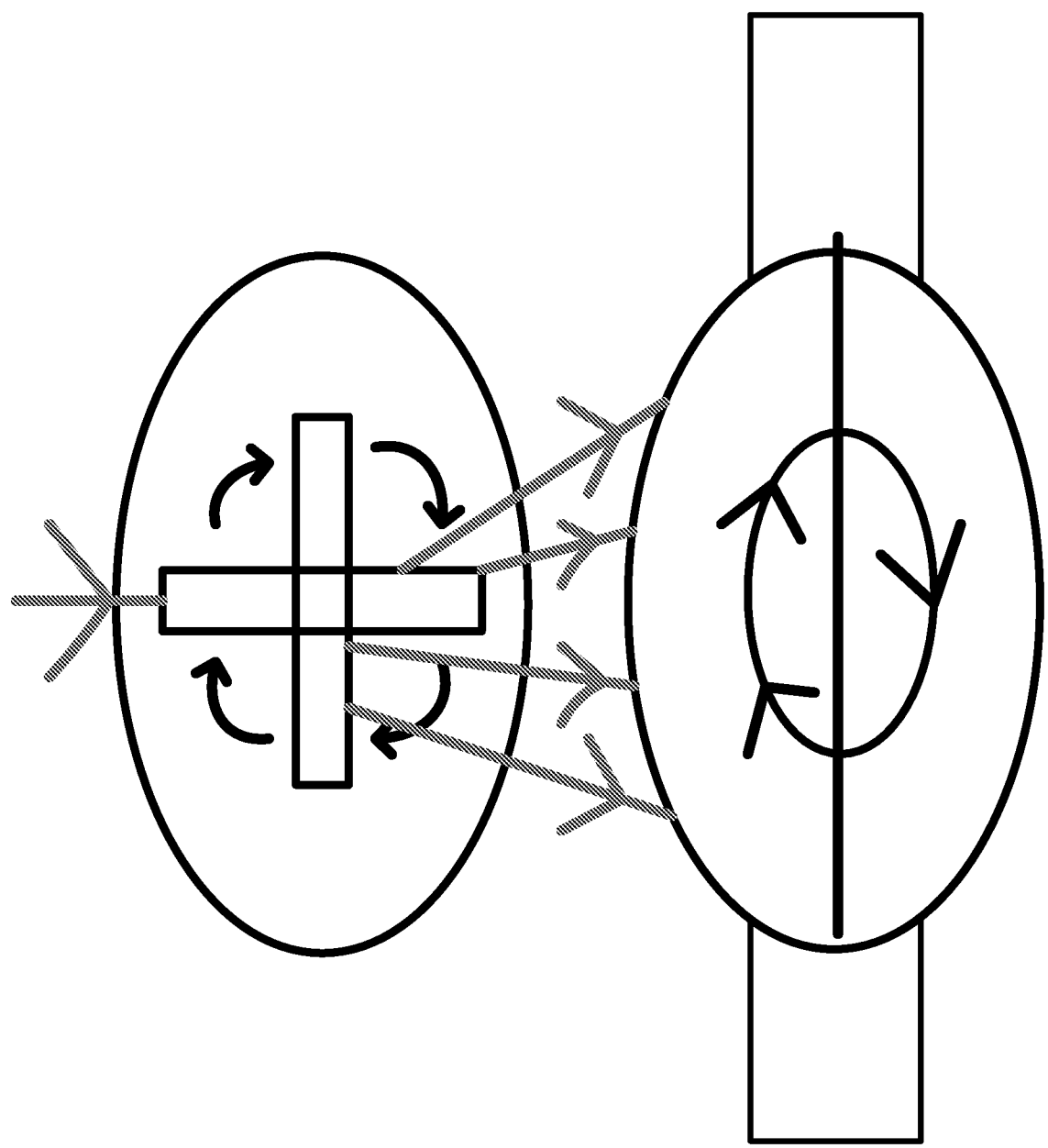
FIG. 5 shows an assembly of rotating imaging elements, e.g., chips, working in tandem with moving optical components.

FIG. 5 shows an assembly of rotating imaging elements, e.g., chips, working in tandem with moving optical components. High speed motion picture cameras include moving elements, such as optic elements, to provide static images onto moving film, foregoing aspects of intermittent transport to facilitate faster transport speed through the camera—while maintaining sharp image captures. Herein, a further configuration of the present invention replaces intermittent, or "stop and go" motion of imaging elements (chips) and/or optical elements, such as lenses/mirrors, with an assembly of rotating or otherwise moving chip(s) working in tandem with moving optical components, to deliver sharp image portions to at least one chip (or imaging element,) varying the portions of the lens image captured with intermittent motion being selectively replaced by fluid tandem motion of cooperative components that complete a cycle of a (preferably variable) number of image portions to create a mosaic key frame, before repeating the cycle, for example, every second.

Increasing Efficiency of Film Stock

Like VistaVision technology, film would be provided to the film gate horizontally, making the image size only limited "vertically" by the width of the film (gauge size,) such as 16 mm or 35 mm. In a further configuration, the film stock, (16 mm in this example though 35 mm is equally exemplary,) the film stock itself would not need sprockets; with the registration technology options today, and transport options, sprockets are cumbersome and wasteful of potential image storing media. The present invention, in the 35 mm configuration, would provide an image of a resolution and quality (original) that surpasses any digital originating information capturing means existing, providing the sole option today to capture a visual that only "tomorrow's" digital or other technology will have the ability to approach, during image capture.

Film can be selectively provided by a conventionally positioned film magazine, (of the normal or "disposable" configuration disclosed herein, involving reusable magazines loaded and unloaded by the manufacturer only). Film could be provided by a horizontally positioned magazine; meaning 90 degrees perpendicular to the normal upright position of film magazines. This precludes additional film management and positioning needs, such as rollers turning the film 90 degrees to get it into the horizontal position for the film gate, and then back 90 degrees again after exposure to replace within a vertical film magazine. This positioning of film stock is useful in the present configuration as described for the present invention.

Herein, the providing of film stock to a film gate which is selectively similar, and selectively variable, in dimension to a rectangular cinema display screen, such as 1.66, or 1.85, (or for the present configuration the width herein will be 2 to 1. The advantage is that, in the case of 16 mm film, the visual can be selectively stored on an emulsion surface 16 mm "high", or closer to 14 mm if perforations are maintained on one side, and as wide as desired, in this instance, 33 mm or wider, for example. Though, the width would be entirely selective, potentially, by virtue of the virtually unlimited left/right media space per visual.

The present invention, in part, thus provides means for generating 35 mm, for example, wide visuals on 16 mm film stock, and visuals in very close dimension to cinema and HD screening dimensions, requiring little adjustment or distortion in the processes of providing final images to these screens. And, as said, 35 mm film stock would provide the critical means to originate material that surpasses the information capturing/storage means of any digital system, potentially for the foreseeable future. The emulsion surface area will approximately quadruple the visual information per image stored in the film stock. In fact, the use of 35 mm double-sided emulsion film stock and modified 35 mm film cameras, allow for an increase of emulsion area per visual of between 2 and 4 times, or more, than that typical to 35 mm film capture, depending on the amount of overall recording time the magazine of film is selectively reduced to, for example, from 10 minutes.

In one configuration, a single visual is recorded horizontally onto the film stock, which is selectively positioned parallel to the horizon line, relative to the film recording plane, and the lens capturing the visual. The recorded single visual would selectively occupy the space once allocated to, for example, three frames of 35 mm images. The dimension of such a recorded image is selectively very close to the horizontal dimension required for theatrical visuals, utilizing the increased emulsion made available, to a great degree and with minimal waste and "masking" needed to achieve the motion picture screen dimension, such as 1:85 to one, or even more rectangular in shape.

Herein, the use of the space of three typical film frames' emulsion area, would be compensated by the use of the opposite side of the film stock for recording as well, resulting in total recording time of a typical 1,000 foot roll of 35 mm film, 10 minutes approximately at 24 frames per second, to just under 7 minutes, though with a total emulsion surface area per image increased to approximately 4 times what is conventional on 35 mm, if not even greater recording surface area. Maintained as 10 minutes of material at 24 fps, the emulsion surface area over typical 35 mm vertical, single side of stock standard,) still vastly increased without affecting the standard recording time of a "roll" of film.

Again, as films today typically reach a "digital intermediate" stage, the fact that the film exposed is not created with "projection" in mind is logical and inherent to this invention. In fact, sprocket holes are not necessary, in a film transport means based on a selected advancement distance; digital post production means may provide perfect registration of final images, (and matching of images by code or other means,) from one "side" or strip of the film stock and the other. The sprocket hole and other film area may thus be employed selectively entirely in the recording of visual and other data, either entirely in the emulsion or within selected other means provided in the stock, including, but not limited to, magnetic recording material.

After exposure of the double sided film stock, it is likely that after processing of the film, prior or selectively after being "split" and separated into two strips, the lengths of larger horizontal filmed visuals will be digitized by an adapted "data-cine" or "telecine" apparatus capable of scanning the larger film frames; following digitization, these "negatives" on the thinner strips, relative to conventional 35 mm film, will be stored then for possible future "re-scan" when increased scanning and data storing means exist, beyond what today's technology can offer . . . . These larger filmed frames thus contain the additional image data for future application, relative to conventional 35 mm productions, or conventional digital cinema, e.g., digital origination, available today.

In a further aspect, the present invention provides selectively mirroring or related optics/image diversion means may relay the lens image to one film gate on one side of the film stock, for recording, and then the other gate, in a staggered delivery, prior to the film stock being advanced to the next horizontal frame of unexposed emulsion; in this configuration, the film stock would thus need only be advanced twelve frames per second, to achieve the 24 fps overall recording, both sides having been utilized. The image diversion means may selectively provide all, rotating mirroring or other means, or part of the lens image by beam splitting means, to each of the respective larger film gates. The lensing and hardware would be naturally adapted to accommodate the selectively width variable film gates which now are closer in size to the old "70 mm" film gates, in size, (which recorded visuals closer to 50 mm in actual recorded image width, depth of field and related photographic aspects selectively being affected by the change in "gauge size" or gate size, to the degree that optics and related hardware would need to accommodate same.

The present invention thus provides means to expose both sizes of film of a selected gauge size, with the use of 35 mm film, for example, providing filmed visuals of a resolution far superior to typical 35 mm filmed recordings. These film recorded visuals would selectively provide more information per visual than conventional digital systems can deliver today, thus providing filmed visuals potentially more compatible with digital (and other imaging systems) of the future, as the larger emulsion area holds a vast amount of visual information, surpassing image origination data typical to even the newest digital cinema options.

Should the 16 mm format be used to originate under the present invention, a final "print" from the "horizontally exposed" images to a conventional 35 mm film stock in the conventional direction and format, might be affected by printing means to alter the exposure level and/or color aspects as the visuals are "printed" onto another film stock, such as an "internegative" stock.

The goal being, to end up with a high quality negative of the "larger" gauge size, embodying aesthetic adjustments chosen in the digital domain and also benefiting from the unconventional use of the smaller gauge format, for example, 16 mm, to achieve visuals of, or nearing, those typically recorded by the larger gauge size, conventionally.

In total, the present invention provides means to originate with film using "smaller" lighter equipment while resulting in the comparable "original negative" surface area, and resolution and quality, to larger film gauge bases. Further, the present invention allows for origination with familiar 35 mm systems, including the lensing and housings familiar to the industry, while resulting in visuals with quality and resolution comparable to "70 mm" originated visuals, thus achieving the goal of surpassing the amount of visual information captured and stored during original photography of any digital system presently available, even if the initial use and screening means does not employ larger than existing digital technology, such as 2 k or 4 k, as the "existence" of an original "negative" that future technology can extract vastly more visual information from, for example, 20 k, renders that project "future ready" and in fact more in synch with the future of digital cinema and television than any existing digital origination means may provide.

With the enormous expense of making and releasing films, the availability of an original negative that may provide future applications in synch with the capture devices of the future, increases the potential for that project to be displayed more in the future, should systems upgrade to larger information management/display means, without significantly changing the capture, weight and expense aspects of originating on film.

Further, the staggered relaying of the lens image to one side of the film emulsion and then the other allows for the double sided film emulsion to be advanced once for it's entire length, without employing the other options of reversing the direction of the film, or employing a continuous "loop" and reversal-of-side or twist, means to allow the camera to expose one side of the stock entirely and then the other, entirely. However, the present invention does not preclude those or other options being employed in the horizontal exposure of the film stock, on both sides.

In another configuration of the present invention, conventional film stock of any gauge size, is exposed horizontally. The "magazine" of film storage means, often placed behind, or above the camera's mechanism and film gate, is selectively placed behind the camera, as is common in cameras by Arriflex and Aaton; this positioning is however not essential.

The film in this storage, e.g., magazine, would be horizontal not the typical vertical position, and thus parallel with the horizon, if the shot being captured were of a sunset/horizon for example. Thus, the film would enter the camera mechanism or film gate area as with Arriflex cameras, in the horizontal position. In the case of 16 mm film, the sprocket holes on single per stock, would selectively be occurring on top, or on the bottom of the stock, as it is presented to the camera film gate for exposure; without necessity, the present invention positions these sprocket holes on the bottom.

In the case of typical 35 mm stock, the sprockets occur on top and bottom; the present invention in one configuration involves film stock with only one side bearing sprocket holes, or in a further configuration, no sprocket holes as the digital domain eliminates the issue of registration, such subsequent picture matching occurring selectively in digital post production reducing concern over exacting position of film stock through the mechanism and film gate of film cameras.

The optics of film camera(s) would be modified to be similar to those of a larger gauge camera, as the present invention provides for exposure of emulsion areas typical to the "next step up" in gauge size: 16 mm cameras providing more like a 35 mm exposure emulsion area and 35 mm cameras of the present invention providing a remarkable gate and emulsion exposure area potentially surpassing that of typical 70 mm stock exposure by known 70 mm film cameras (and 65 mm, and others related to this large gauge size.)

The distance of optics to the film plane as well would be adjusted to allow for proper exposure of the larger provided emulsion surface area.

The width of the exposure area would be, selectively variable and, typical to high definition television display, thus the ratio of width to height would selectively be the same or similar to that of the eventual intended display systems/units. However, though an important configuration of the present invention is for this important dimension (such as with plasma TV monitors providing high-def content,) the width of the gate size could be variable in the present invention. Thus, the actual amount of film intermittently moved through the gate area would change selectively based on the display system, or setting, intended for the material, potentially. For example, if the material is destined for conventional TV display, a 1:33 to 1 ratio of film would be exposed so the potential of the present invention in the 16 mm camera configuration, would expose a negative image of approximately 14 mm×18.6 mm. If the intended display were high definition TV, the negative exposed and amount of film moved into the gate area would change to be approximately 14 mm×23 mm; and if the eventual display were a theatrical screen as wide as approximately 14 mm high×33 mm wide. These dimensions are important, as with the theatrical screen shooting intent, it is important to note that the present 16 mm configuration provides a significantly larger emulsion area for material that actually makes it to the screen, than today's typical 35 mm cameras, which for wide screen are often limited to capture emulsion dimensions for "live" material of approximately 14 mm high×21 mm wide.

In this configuration, the film gate is in the same position basically, as all film cameras used conventionally. In a supplemented version of this configuration, the film gate could occur horizontally, or otherwise, to allow for the second film gate of the other configurations of this invention, wherein both sides of the stock are exposed.

Though in both versions, the single and double gate versions, the selective variability of the exposed frame width is a one aspect of the present invention, changing literally the length of film advanced into the film gate based on the desired width of negative selected. In this way, film negative is never "cropped" and wasted as oft happens with 35 mm photography, wherein cropping vertically allows for the negative dimension to match the very rectangular shape of some film screens; the present invention allows thus for a superior image quality for such screens, on 16 mm for example, than 35 mm is capable of rendering via the currently configured camera systems.

The Film Stock and In-Camera Configurations

Embodiments of the invention that need not be in one particular configuration, include the double sided emulsion film stock and the double side exposing film camera:

The double film gate disclosure of the present invention and filings, may selectively not be perpendicular to the lens surface area, but positioned as typical film gates occur, though the two gates may be staggered (above and below, or at different points within the camera,) allowing for optics and selectively mirroring and/or other lens-image diversion means, to relay the lens image in it's totality, or a portion of it selectively if beam splitting is employed, to one gate and then the other.

In this configuration, reference information can be imprinted visually or by way of a data track or other recording means, to allow selectively the frames of film representing sequentially captured visuals, whether one exposed immediately after the other, or simultaneously, or later. Thus, film stock may undergo looping or other related in-camera management, via rollers and related components common to film cameras, in order to provide the reverse side of the same length of film stock for exposure. See U.S. Pat. No. 5,687,011, incorporated herein by reference in its entirety.

The length of double-sided film, e.g., emulsion occurring on both sides as it moves through the camera, may be exposed in a staggered frame-by-frame approach, e.g., an image on one side, then the other and then advancing the film to the next unexposed portion of stock, or the entire length of film may be exposed by way of a single gate system, whether parallel or perpendicular to the image capture lens, or otherwise positioned, with the reverse side of the same length being provided via film direction reversal means, or continuous loop and mechanical turning of the film stock to provide the second side after exposure of the first, or other such physical approaches for providing same.

Also, it is important to reiterate that the double sided film stock can be employed as a recording "time" enhancement, not quality related, allowing for the two sides of the film stock to be recorded as discussed above, with a conventional "gate" and exposure dimension to typical film cameras. The advantage therein being that recording time is exactly doubled, and conventional digitizing and film printing and processing machinery is set to deal with those particular exposure sizes, the vertical position of the images and the number of "perforations" per visual (or sprocket holes,) thus requiring only the issue of the potentially (selectively) thinner strips of film, if double sided film is "split" in to two strips prior to digitizing and/or processing and/or film printing, etc. An objective of the present invention is to provide film stock, (whether single or both sides emulsioned,) that is the same or similar weight and thickness to the stock that cameras typically manage today, though this is not essential or a limiting aspect.

Regarding the film stock of the present invention, in the single sided configurations of the horizontally provided film stock, one configuration would eliminate sprocket holes/perforations, allowing the film to the moved through the gate through the motion of the rollers (holding the stock and/or within the camera,) to allow the extra emulsion area lost with such sprocket holes to become media/image recording space. However, the present invention also works with the configuration of using typically available film wherein such sprocket holes occur. As both options may be provided in the future, the option of selectively adjusting the exposure area both with regards to width and height would be selectively provided in one configuration, to allow optimal use of emulsion area provided by a given stock's composition, for example, with or without perfs.

Therein, it is selective that film stock of the present invention that lacks sprocket holes may be transported roughly by the machinery of the camera, with subsequent perfecting of the "registration" of the pictures to each other occurring in the digital domain, or selectively markers occurring optically or on other data storage means, as an aspect of the film stock, may allow for laser or otherwise guided registration and film transport, such guidelines or markers also providing the means for a variable transport camera of the present invention, those moving a selectively adjustable length of film into a selectively wide gate area, to precisely quantify the transport of an amount of film per exposure.

Again, such cameras may operate ad variable speeds as with conventional cameras, however in the double sided configuration, wherein 24 fps is the anticipated final "digitizing" or display goal basis, even if altered in the video/digital real for digital display, the film need only be moved 12 time per second, in the configuration where the exposures are staggered (side 1, side 2, side 1, side 2 and so on), if the goal is to achieve a conventional 24 visuals per second of time.

The double sided, two sided emulsion coated film stock can be produced in a variety of configurations. In one non-limiting configuration, two lengths of "thinner" film stock are married to create a length of film stock that is a conventional weight and thickness for cameras, despite the emulsion occurring on two sides. Other configurations of doubled sided two sided emulsion coated film stock can be produced. Further, selectively, an opaque partition between the emulsions on each respective side, such as a white celluloid, and/or plastic, or other reflective material, can provide that in the digitizing stage of the double sided emulsion, the film stock may be maintained, and created as, a single strip, as with conventional film stock: It would thus mean that in digitizing light would be reflected back from the film emulsion, based on the opaque later behind allowing for such reflectivity, to allow for digitizing as with reflective art, rather than as with light typically being projected through the film stock.

If digitizing in this way were of sufficient quality, relative to the projected approach, the need to "split" the film for separate digitizing, or printing or other use, of each separate strip would be avoided. The film could be digitized, both sides, one after the other, or simultaneously by a digitizing unit configured for that purpose, and maintained and stored as a single strip of selectively the same thickness and weight as conventional stock, with the only difference being that this double sided stock contains twice the image recording area means.

In the management of visuals shot in this "double sided" configuration, data referencing, e.g., visual or other magnetically or otherwise recorded data, on the film itself, each side, would selectively allow for all stock to be scanned, and even though the "second strip" might be digitized some time after the first, in the "split" stock two-sided configuration, the time-code or visual reference information (the "data") would allow for computing means to automatically assemble the visuals in digital form into their proper sequence, as they were captured. Thus, though not limited by this, the present invention is most geared to film capture of visuals destined to be, at some point, digitized and/or managed in the digital domain; even if eventually returned to film for display or other purposes.

Quality and Efficiency of Film Capture

Key filed frames can be exposed through the same lens as video/digital material, being used subsequently in the digital "recoloring" of that digitally originated material.

Aspects of the present invention are not limited by the term video, as digital visuals and digital visual data is indeed applicable, if digital origination was employed, e.g., for the "high definition" material. Further, high definition images stored on tape, does not preclude or is not limited in the present invention or that invention by how said digital (and/or video) images are stored, on tape, in a "drive", or on disc. The issue is the selectively simultaneous exposure of video and/or digital material and filmed visuals of the same or similar visuals (through the same lens, or lenses selectively positioned to capture similar material.

To provide new options affecting the quality and efficiency of film capture, herein is disclosed the selective further aspect of the system or method of exposing filmed visuals on any gauge size in conjunction with video and/or digitally originated images, and captured through the same lens or selectively by lenses separate but positioned for use by the present invention.

In one aspect, the film gauge is 16 mm film and the video media is digital high definition, e.g., digital data, and/or video data captured by CCD or other electronic capture means.

In the 35 mm configuration of the present invention, regardless of whether the film is exposed conventionally, horizontally, or on one side of film stock or on both sides of double-sided-emulsion on both sides-film stock, the opportunity is to capture, selectively, original visuals containing a vast amount of visual data surpassing today's standards, even surpassing old 70 mm film capture systems. Again, this is relevant for potential future digital or other visual means that may utilize the extra visual data of this large negative area, such as future systems able to manage "20 k" or higher.

A further aspect of the invention provides means to capture visuals on 16 mm that surpass 35 mm conventional image quality, and 35 mm images that surpass any digital capture for cinema means conventionally available.

Herein, the selective option of capturing fewer than 24 fps of film originated images is provided. Further, the "video tap" is in fact a high-definition video (and or digital) capture and storage means. This accomplishes the dual goal of enhanced preview on set during capture, by way of the digitally captured visuals, providing material at conventional digital rates such as 24 fps, or 29.97, or 30 or other known options employed for digital origination. Further, the digitally originated visuals, would contain cross reference image data related to the filmed visuals, e.g., selectively captured through the same lens, by way of beam splitting and/or image diversion means, such as mirrors and known optics, for later cross referencing between digitally originated (and stored) visuals and the film originated visuals. Magnetic striping or visual reference, or other data recording means on film, may be provided to allow for easy and selectively automatic cross referencing between the two types of originated visual material. In this configuration the film camera is primary, the digital unit relative equal or secondary with regards to "on line" capture material.

The further use of the approach is expanded, to acknowledge filmed visuals not used solely in "re-coloring" digitally originated material. The combination of highly resolved filmed visuals, exposed by the usual means and with the usual care, typically handled by a director of photography, with the secondary capture and storing of digitally captured material of the same scenes, and or visuals, selectively at the same or similar points in time.

The expanded purpose, herein, involves the desirable aesthetic and post production use of film originated material, potentially different from re-colored digitally originated material. Further, "morphing" and related image extrapolation e.g., inferring, technology may provide proprietary software to allow for the following:

Filmed material captured to be done so at a lesser frame rate than is conventional, such as 12 fps, or even fewer frames per second. Present technology employed as an aspect of the present invention, would thus allow for extrapolation of the "intermediary frames" not captured by film, to occur by way of digital approximation, based on inference of the digital data's position and shifting between available "film originated" frames, once digitized.

Further, exacting means to provide this "morphing" or creation of inferred visuals between available filmed ones, by way of the high definition digitally originated material. Therein, visuals indeed exist, highly resolved, to potentially aid in the creation of the inferred, and/or morphed visuals, which were not filmed, but are created from the filmed visual elements nonetheless. The positioning of aspects of the filmed visuals would be entirely referenceable within the digitally captured visuals, which doubled also as the visuals used for on-set preview, and initial editing.

Indeed, all editing of a project can begin and even be completed using the digitally originated materials, prior to receiving the filmed visuals, after processing, in digital form. In the "final edit," or creation of the digital master and/or related intermediates, the digitized filmed material would "replace" the digitally originated material, selectively as a final stage of post production, prior to selective additional adjustments of the visuals by a look manager system or related digital "look" refining means.

Visual code cross referencing data, carried through from the film negative to it's digitized version, relative to the high definition originated material, would selectively allow for immediate visual cross referencing exact to each frame.

Thus, several goals are accomplished:

16 mm film may provide conventional 16 mm and super 16 mm visuals, vertically exposed, either on one or both sides of film stock selectively, which may be exposed at a selectively slower frame rate, e.g., 12 fps, to allow for a longer record time from a single roll of film stock. Further, horizontally exposed visuals may provide emulsion areas per visual as large as approximately 14 mm×33 mm, surpassing typical 35 mm film origination quality, and selectively without changing, or even while increasing the overall record time a single roll of 16 mm provides.

Selectively few filmed frames may actually provide a sufficient amount of filmed image data to infer digitally, with or without use of the digitally originated material. Further, the disclosure of dual film gates, allowing for exposure of both sides of a two-sided-emulsioned film stock, with optics relaying the lens image first to one gate, and then the other, would selectively double the available visual data recording area provided therein. In total, the present invention would selectively allow for a final result, in digital form, or other visual form including film final, of filmed visuals surpassing 35 mm conventional filmed quality and/or resolution, while selectively maintaining all or even increasing the typical record time provided by a roll of 16 mm film, such as approximately 10 minutes. In one configuration, the record time would at least be doubled to 20 minutes per roll, while gaining the approximate 35 mm filmed quality emulsion area from a 16 mm stock; digital extrapolation means and/or double sided film stock aiding the effort.

A further benefit of the horizontal exposure variable film gate and film advancing quantity would be selectively employed, allowing for filmed visuals of any gauge size) to maintain the full vertical available recording area of a film stock, such as 35 mm if 35 mm sprocketless film were provided, while adjusting for the display ratio (1:33, 1:65, 1:66, 1:85, 2:35, all to 1) by providing a selectively larger (wider) amount of film stock for exposure per visual; thus affecting the length of each "advance" of the film stock, selectively intermittently, to provide the next portion of unexposed stock to the selectively varied film gate. Little or no waste occurs, or masking then, in providing a film stock ratio specific to a display ratio, all rectangular display systems, no matter how narrow or wide, being potentially serviced by visuals exposed based on the same screen ratio.

For 35 mm film stock, one configuration involves, as with 16 mm camera configuration, film stock that no longer involves perforations/sprocket holes. However, accounting for same presently and still claiming the improved image recording area of one configuration when that is available, the present invention and the above means described, would allow for film capture of visuals superior to the old 70 mm film originating, from 35 mm film, while not reducing, in fact selectively increasing, the total record time provided by a 1,000 or other size or length of 35 mm film. Thus, the filmed negative, of 24 fps or fewer, may be stored and referred to in the future when that negative may provide image data for higher information management systems, such as 20 k or higher, which present digital information would not be able to supply with visual data utilizing the capacity of such future, standard systems and options.

Further, digitally originated material may be employed in affecting the final digital material, it's look or other aspects, selectively; the digitally originated material may provide improved resolution or aspects to the filmed images, inherent to such electronic capture, selectively able to be contributed to digital visuals created from referring to both digitally originated and film originated material.

So, in a further system configuration, a firm(s) can provide the film stock for the system, whether conventional or adapted from what is typical, the digital "look management" and frame "inferring" or morphing software, the digital cross referencing between digital and film originated visuals, selectively exposed through the same lens selectively at the same or similar times, means to process and scan selectively horizontally exposed film frames of potentially different widths, among other necessary aspects of configurations of the present invention.

An incomparably efficient film camera would thus, in certain aspects, provide filmed material for the best present and future resolution options, with the ideal "video assist" in the form of high definition digital material captured through the same lens as the film. The end result being a minimally changed shooting scenario and equipment scenario on-set, an improved or at the least minimally affected shooting time per quantity of film stock, and an uncompromised or improved final "film originated and film look" digital result, selectively equal to or superior to such results from typical film systems of the next "larger" gauge size, (16 mm providing 35 mm quality, 35 mm providing 70 mm quality, etc.)

The present uses do not limit, though, the fact that high quality filmed and digitally originated material then exists relative to the same scenes and production; options beyond what have been stated exist and will exist relative to the existence of superior film negative and high definition digital material relative to the same shots or lens visuals.

Whether applied to conventional film stock and conventional vertical exposing and frame sizes, or adapted stock and exposure approaches, as described herein, embodiments of the present invention improves the visual quality and/or efficiency of film capture.

Horizontally Positioned Film Gates

In providing the camera lens image to the film stock, herein a horizontally positioned gate, or gates, has been disclosed in creating options to increase image capture quality options. In a further aspect, optics (and/or mirroring means) may "turn" the lens image 90 degrees before providing it to a vertically positioned film stock, as with today's conventional film cameras, wherein a fixed or variable film gate, where the width of the exposure area on the film stock is selectable, is not in the usual horizontal position relative to the lens and scene being captured, but offset 90 degrees.

Thus, film magazine(s) of cameras need not be repositioned and film stock need not be twisted or repositioned to achieve a horizontal film plane relative to the lens, as disclosed previously. Herein the lens image visual (light) is turned and/or bounced to be relayed at a 90 degree offset, as occurs with flatbed film editing tables, the film stock image being turned for display on the projection monitor. Again, the optics of a 16 mm system would be that of a 35 mm camera, or other option, including custom made option, to allow for the larger image area relay to the film stock. Again, the image area for exposure on the film stock would exceed that of the "next up" film gauge, as the film would be exposed horizontally on the stock, relative to it's length, to allow for the image height to be limited only by the gauge size, and the image width to be variable, limited only by the selected image ratio, based on selected final display system/option dimension or ratio. See drawing. In essence, the film gate is turned 90 degrees, is optionally of the variable type, as disclosed herein, and is provided with a lens image that has also been turned 90 degrees, to allow for proper exposure of the lens image in the ratio/dimension desired, though on film stock horizontally, as opposed to the typical film systems of today, wherein visuals are exposed vertically. The width of the visual is limited only by the gauge width of the film stock.

Hybrid Digital and Film Camera

Yet another embodiment related to the present invention is a hybrid digital and film camera, utilizing conventional 16 mm negative motion picture film stock. This in no way limits the application of the following with regards to gauge size, and it should be noted that sprocketless versions of any film gauge size, (or sprockets on only one side as with single perf stocks,) would allow for proper application of the present option(s):

Herein, the conventional film gate (vertical) associated with 16 mm motion picture cameras would be replaced by a modified "double sided gate," which would accommodate two strips of 16 mm stock, emulsion out, facing the lens image, allowing the sprocket holes of the stock to be on the "outside" of both strips, thus also on the left and right sides of the double gate.

Separate, linked film transport means, would allow selectively one side to move down, while the other side or strip of film would move up. Intermittently, unexposed portions of film stock would be "side by side," with only the very small strip, or line, between the separate stocks interfering with the capture of the lens image.

Selectively, the lens image delivered to the side-by-side strips of emulsion, would occupy 4 conventional 16 mm or super 16 mm frame areas. Thus, a single visual would be delivered to (selectively) approximately an area of emulsion, comprising the two separate strips, of more than conventional 3 perf 35 mm image recording means/area; in fact, the actual area provided selectively by the present invention is 15 mm high by 26 mm wide, two vertical frames/perfs per strip, side by side, providing an overall area of 364 square mm. This is an improvement over the emulsion provided by 35 mm 3 perf (1:85 to 1 image ratio) of over 5%, selectively.

Employing the "key frame" approach to utilizing filmed frames, whether captured as a single image or as a composite of separate captures, to improve resolution and/or aesthetics of digitally captured material, the present invention would allow 16 mm film cameras, with selected modifications, to capture the image data necessary to infuse digitally captured visuals with over 6 k of per-image data.

Proprietary software would allow for such image captures on two strips of emulsion, to be referenced by time code or other image coding referencing means, for application to the respective selected digitally originated visuals, captured selectively through the same lens at, or in and around the time said key frames were captures. This digitally originated material may be at a normal frame rate, such as 24 frames per second, selectively. The selectively flickerless and selectively high-definition digitally originated material, may selectively provide the image-zone (aspects') positioning data for proper allocation of the filmed key frame image data, in the creation of final visuals, (24 per second for example,) which embody in excess of 6 k per visual image data, as a result of application of key frame data to more than one digitally originated visual.

Herein, magnetic and/or visual coding means on the film stock, (selectively restricted to the film area to the thin side or edge of the perforated side of stock, or to other areas not restricting the emulsion area for image recording will provide cross referencing data for easy and/or automatic referencing between digitally originated visuals and filmed key frame visuals, for post production applications.

Thus, the film stock in one configuration is from a single roll of unexposed stock, as with conventional film cameras, the lens image is selectively diverted to allow for recording of the full lens image by a digital capture and recording means, with the same lens image providing the full lens image for selectively exposure as a variable, e.g., 1:33, 1:85, 2:35, ratio image on film stock selectively providing an emulsion area larger than conventional 35 mm capture, e.g., for cinema.

This film stock would undergo a repositioning, e.g., by rollers or other means, after initial exposure by the left side of the gate, allowing for the "flipped" stock to be returned for exposure by the other side of the gate, with the "emulsion area" still facing out, toward the lens image. Selectively, "double sided film stock" could allow for film to be returned to either side, both sides containing film emulsion, with a final result of a single roll of film stock having both sides full exposed, embodying latent images within emulsion on both sides of a single celluloid strip. In the simple configuration, conventional single sided 16 mm stock is described.

Selectively, each gate "side" would expose on, for example, two conventional "frame" areas, or emulsion related to two perforations of stock, and advance skipping the next two, as the other side can use that stock to expose the "other side" of the lens image, ongoing, intermittently. Time code reference for each and every perforation, or image portion, would make this jumble of visual parts easily sorted and allocated in post, automatically, selectively after a project has been edited from the digitally originated visuals, and final visuals are selected for affecting with the digitized filmed key frame visuals which are of improved resolution and/or aesthetic appearance.

In further aspects of the present invention, provides increase in visual quality, and also improvement in efficiency. As a single key frame per second, with appropriate post-production software, may be used to affect at least an entire "second" of digitally originated visuals, such as 24, a single roll of 16 mm film typically providing only approximately 10 minutes of recording time, may in fact provide now 60 minutes, selectively, while also providing a final film originated "look" result of 4× the normal resolution provided by typical super 16 mm systems. Selectively, more key frames per second may be exposed, and/or frames of different overall emulsion surface area, providing more or less recording time per roll of film. Should a roll provide 6 key frames per second, or one for every 4 digitally originated corresponding images, the recording time of a single roll of film still is not less than a conventional 16 mm camera and recording system, at 24 fps.

The present invention can provide the film stock to a conventional "take up" spool, changing the mechanics of the film camera as little as possible or selectively necessary; the stock having traveled through the double sided gate twice, being the key modification and mechanical modification. Further, in a modified film camera, two rolls or two separate strips of film may be delivered to the double gate, allowing separate rolls to literally be transported in the same direction through the double sided film gate. In this configuration, the advantage would be the amount of film stock overall, increasing recording time even further, the fact that smaller stock, for example, 16 mm as opposed to 35 mm, may provide images with higher resolution than conventional capture by 35 mm stock, and the further advantage is the elimination of the need for "twisting" the stock through various repositioning means to allow it to be exposed, and redelivered to the other side of the double sided film gate, for re-exposure, selectively in the same direction (up to down,) as before, or in the opposite direction (down to up,) before return of the exposed stock to the take-up reel.

Again, this system relates to a hybrid camera, selectively, wherein a digital image capture means captures through the same, or an adjacent, lens full conventional image captures at a selectively normal frame rate such as 24 fps, while the double-sided gate provides selectively very high quality filmed "reference" or key frames of the same or very similar lens image/visual.

It is very important to add, that the application of the horizontal aspects of film gate and film emulsion recording would provide an enormous gain in resolution, regardless of the film gauge size involved. Describing this improvement relative to 16 mm stock, a 1:85 ratio intended display dimension, and thus image capture dimension, and wherein one key frame, from two strips of the same length of celluloid/stock, is generated per second:

The emulsion area exposed, with the two strips positioned now as "top and bottom," instead of left and right, is increased to selectively 24 mm high×45 mm wide, each strip of 16 mm stock from selectively the same length traveling selectively in opposite directions providing 12 mm, or half, of the vertical recording/emulsion area of the full visual capture zone. This represents an overall final, digitized key frame containing over 18 k of data from 16 mm capture. Further, with one key per second being generated on film only, the overall recording area of a single 400 ft roll of conventional 16 mm film stock is still increased to 20 minutes over conventional 24 fps below "2 k" capture, doubling the overall film recording time while increasing image quality approximately 12 fold. This is indeed significant, as filmmaking logistics and methods are not compromised, equipment is not noticeably modified, in weight and selectively in configuration, and there is not only not a demand for more media in providing profound increases in visual quality, but a need for less, e.g., half in this example application.

Again, the horizontal gate configuration would place the strips of emulsion selectively in contact, or very close proximity to each other, one over the other. The selectively variable recording area of the horizontal gate area, would expose selectively images from 4 perforations wide (for TV ratio) to 6 wide, (for 1:85 cinema) and up to 8 perforations wide for providing images of 2:35 (wide screen) ratio, which is remarkably a final image data per visual result of approximately 23 k, from 16 mm stock with recording time still improved per roll, at nearly 16 minutes.

It is important to mention, a key aspect of the proprietary software of the present invention would be the digital means to "eliminate" the fold or "missing data" of the small gap occurring between the two strips of film. The digitally originated images would contain all the data necessary, (at 2 k resolution) for example, for seamless allocation of the "halves" of image data from the film stock, as a small line of "2 k" image resolution marrying halves of much higher resolution, would not be jarring or noticeable. Further, an aspect of the present inventions software would selectively involve extrapolating acceptable "transition" image data between the separate halves of film stock, e.g., captures, for seamless final visuals from the system of the present invention.

An improved aspect is that to expose the emulsion areas detailed herein, no moving optics or moving "gate" aspects need be employed, as both strips of emulsion are exposed simultaneously: Herein 16 mm double strip provides the resolution of single strip 35 mm horiz. 8 perf.

Increasing Quality and Recording Time Of Digital Image Capture

A variety of configurations and options related to hybrid cameras are provided for imaging that allow for increased quality, recording time and other advantageous aspects for entertainment imaging, such as for cinema and television and other motion media.

In one aspect, one media captured selectively simultaneously with aspects of another media capture is used to affect the latter:

An all digital hybrid configuration is disclosed herein, for the purpose of extending the resolution, and amount of overall data per visual, possible to capture, for both still photography and motion media.

In a further aspect of the invention, a high definition digital camera captures selectively both a full visual capture of a lens image, and selectively through the same lens portions of the lens image in higher resolution, wherein said portions are captured for the purpose of affecting, or being affected by, said full visual capture, which was selectively of a lower initial resolution.

For example, one configuration of this invention involves a standard or "normal high definition" video (digital) capture of an image being delivered through a camera lens. This is selectively provided by "video tap" configuration, deriving the image capture from only a portion of the lens image, and selectively also this full visual may be captured through its own independent lens, as a part of a single camera with multiple lenses, or as a separate camera altogether configured to work in tandem with the unit capturing the "higher definition portions of the visual for later applications with/by the full visual capture.

In a further configuration, wherein all visuals are delivered through a single lens, the full visual capture is garnered from a selectively minimal portion of the lens image, requiring only a small portion of the "light" or overall visual information gathered by that lens, for proper rendition of the lens visual in the aspect ratio selected, (such as 1:66 to 1, or 1:85 to 1.)

This initial full visual capture may occur via familiar CCD or other "chip" or other single or multiple electronic capture means familiar with digital image capture, and recorded on tape, on a drive, or relayed for electronic transmission or any selected means for recording and/or relaying the digital data captured.

Time code associated or other visual labeling/tracking data means is provided and maintained/recorded relative to each visual of the full visual captures, for later use as an aspect of the present invention, and the objective of the present invention to end with modified digital visuals representative of the full visuals captured, though with overall resolution, and/or overall image data per visual, beyond what is conventionally possible.

A "subsequent" image capture means from the lens image, selectively the same lens that provided the full visual captures described above, involves a selectively high definition capture means, such as a 4 k digitizing chip(s) device(s,) or other means for capturing visuals of recognizably high photographic or cinema-graphic resolution. However, herein means for providing over a selective period of time, such as a second, only a portion of the lens image, not the full visual captured by the initial (or other image capture means of the present invention,) to the chip(s)/digitizing means. And, this means for providing a portion of the lens image further comprises means to subsequently provide a separate, selectively overlapping or not, portion of the lens image.

In a configuration of the present invention, the "chip(s)" or digitizing plane/means is not flat, but is cylindrical or of a circular or round shape, to allow it to moved, relative to the lens. Further, more than one "chip" or imaging plan/means may be involved in this "cylinder", or unconventional digital capture surface/means, allowing a second "capture" or another portion of the lens image to occur seamlessly and quickly after a previous image portion capture, so that in the course of a second of time, for example, one or more moving "chips" or image capture means, may be provided with new portions of the lens image to provide, for example, a 4 k capture means with a plurality of new lens image portions (of visual data) resulting in a series of visuals that in tandem, may, for example, represent a composite of image-portion captures of a single lens image that when "assembled" into a single visual, may represent a single visual with, for example, 20 k, 40 k or even 120 k of digital data, selectively per visual and/or selectively per second of digital video.

Selectively, the full visual capture, itself, for example, a 4 k, or even 2 k, or even lesser amount of data per visual, may in post production and by way of time-code reference, be used as a "template" for assemblage of the plurality of "4 k", for example, captures of portions of the full lens image. This template provided by a full visual capture, selectively captured at 24, 29.97 or other typical digital video capture rate of visuals per second, thus contains useful image position data for an entire second of digital motion visual data, for the plurality of very high resolution image-portion captures to be "applied to." Reciprocally, this process can be stated as the high definition image portions being assembled into a seamless mosaic with image aspects informed, position wise, by the full visual captures, thus the image portion captures are affected, rather than the full visual captures being affected. In essence, how this interdependence of visual data is "stated" does not change the aspect that they are used in tandem to create final digital visuals, either for still photography, a single visual, or for motion video, at 24 fps frame rate, for example, that are of a very high level of digital data overall, such as 12 k, 20 k, 120 k, employing morphing technology, selectively, and/or the full visual captures to "position" the image portion captures' position, and visual aspects therein, as those image portion captures precluded likely, in an among themselves, the proper capture of overall image-aspects positioning information that was captured, or potentially captured, by conventional full-visual captures, at 24 fps for example.

The lens image may be diverted in part to provide the full visuals' information for capture, prior to optical or other means for focusing enlarging and/or delivering, selectively smaller portions of the overall lens image to the secondary recording means, such as the 4 k option mentioned above, and further with means to revise and/or move to deliver a new portion of the full lens image for subsequent capture.

Time code thus, in conjunction with "image zone" reference data, corresponding to the "zones" of the lens image a given capture represents, would result for example, in one second of image data, involving 24 digital visuals from the initial full visual captures, and selectively 24 "image portions" captured and referenced according to their image zone data, resulting in a "single" composite visual of, for example, 24×4 k, or 96 k; when this "single visual" of data, captured over the course of a second of time is applied to the 24 frames of full visual captures data, selectively employing morphing and/or other digital blending technology, and relying on the full visual captures to modify position of the very high definition visuals' aspects, such as selectively identifiable image zones representing objects and/or image portions distinguished according to selected criteria such as color variation or other means to distinguish image zones, the result is a seamless second of modified digital visual data representing 24 visuals, each 96 k, and all or most modified according to image-zones' position to allow the very high definition "composite" of image zones' data to selectively match the true image zone's position capture through the second of time, represented by the 24 frames of full visual data captured during the same second that the image portions were individually digitized. By making use of the highest information digitizing means, and means to reposition image data based on peripheral data, such as the corresponding full visual captures, a composite of available technologies combined with the new options herein, result in a significantly enhanced resolution capture means.

As with rotating drums in a photo-copying system, and other imaging systems, herein a selectively "moving" delivery of the lens image as opposed to a static delivery of a full lens image, to a selectively moving and/or selectively different capture means, such as 4 k CCD(s), a single lens may provide all of the visual information necessary to capture an extreme level of visual information related to a single lens image-digital repositioning and modification means, (as proprietary software of the present invention, may provide new all-digital video camera systems with resolution and/or overall data captured being a selective aspect, based on "how many" separate image zone captures and how much data the capture means may handle. For example, a 2 k image capture means wherein only three image zones are separately recorded each second, would result in a 6 k imaging system, using said full visuals capture option to affect said 2 k image portion captures, wherein only a maximum of 2 k image capture technology is needed.

By focusing the maximum image capture means/technology to selectively changing portions of a single lens image, it is possible to provide the image data necessary for compatibility with the image management and/or screening systems of "tomorrow." Meaning, if 96 k is the "projection" capacity of theatres in 10 years, today, in one aspect of the present invention, means exists to capture image data to allow for a final sequence of digital visuals, each containing and exploiting the 96 k data means, and resolution, that will make projects "tomorrow" for use; naturally if a "film" exists as 4 k, and the screening capacity in a few years is 96 k, if a film were even possibly "assembled" or revised to contain more than 4 k, such as 48 k, or 96 k, the use of that film or project and appeal of it technically will be enhanced in the future, increasing it's long-term value and possible application and viewing life.

An example application, may involve as simple a scenario as a static, flat chip(s) or other image digitizing means, positioned in line with the capture lens; or selectively a digitizing means with limited repositioning means, such as "tilting" left to right, a selective amount relative to the lens image. As the lens image is provided to the image digitizing means, such as chip(s),) an optic element, mirroring, prism means or other image diversion/delivery affecting means, provides selectively ⅓ of the lens image, left to right for example, then the next third, then the next. Then, selectively, the thirds may be provided relative to the next second of visual data, for example, the in reverse direction, right to left. The image portion selecting or diverting/delivery means, may be a rotating mirror or prism, for example, which is returned to the "first third" of the image, automatically, by virtue of it's repeating motion and position; such as a prism being back to it's original position, after it rotates 360 degrees.

Thus, a selectively fluid, if both lens image diversion means and capture means move, capture of different, subsequent aspects of the same lens image, may occur. Or, if the image diversion means has an intermittent motion, stopping three times for example, as a new portion of image is delivered to a static image digitizer, such as a CCD for example, a 4 k digitizing means may provide 12 k of image data relating to the lens image, per second for example, (one complete visual composited, which may be used to affect 24 full frames of visual data, in essence "upgrading" the resolution of 24 "2 k", or lesser resolution, visuals to 24 "12 k" visuals, employing the single, composited/mosaic of 4 k image data representing distinct portions of the lens image, all occurring in lesser resolution within the full visual data of the conventional, e.g., "video assist" or primary capture stage of the invention, digital images captured.

Aspects of the invention include: How many distinct image portions of the lens image are digitized per second; How much they overlap with each other; How many conventional full visual digital images are captured per second; whether the lens, secondary optics and/or the digitizing means, chips or other means, move, are all selective options. The primary issue affecting the choice of these options is the eventual display system(s,) both in regard to resolution, aspect ratio and frame rate.

The objective is to create digital visuals of resolution exceeding the capture resolution of available "full visual" digitizing means. The software options making this feasible include means to affect visuals of the same, or similar, images, by way of time code, and other data options, cross referencing and in regard to image aspects that are identified to correlate: Lips moving over the course of a second, in a the continuous full visual images captured, 24 of them for example, may be enhanced in resolution in all 24 visuals thus, as though each portion of the visual has only a single high-high resolution reference, it is possible to extrapolate that the lips moving, as they "smile" maintain the additional digital data in the high-high resolution composite visual, or mosaic, only in slightly revised positions, informed by the actual position shifts of visual aspects recorded in the conventional full visual digital images.

Again, the mosaic of high-high definition data, creating for example a single frame of visual data per second, may upgrade all 24 frames of corresponding video captured, full visuals, during the second that "single frame" of high-high definition information was captured, resulting in the single reference, or "key frame" of visual data.

The selective capture of a key frame of visual data from a portion of the lens image diverted from another portion, used to capture more conventional digital data, such as 24 fps of 2 k digital visuals' data, is created at a selectively lesser capture rate, such as 1 overall total visual per second, for the express purpose of being used in affecting and modifying the more conventional digital material captured for a specific objective/reason, to "recolor" aspects/zones of the visuals to correspond to the "filmed color rendition" of those same image zone aspects; in the invention herein, to upgrade the more conventional full visual captures to a higher resolution, even a resolution higher than any full-visual capture means existing may allow, through digital application of the assembled key frame "mosaic" representing a single visual captured during the time a number of visuals were captured by the more conventional full visual means.

Again, digital image zone correlation and modification means, and even familiar morphing technology, make the present invention timely, feasible and logical; hybrid technology points the way to modified digital visuals, both in the simulation of preferred "looks", acting-as-if a selected film stock had been the original recording media overall, and in the simulation of enhanced resolution, acting-as-if a very high resolving digitizer had been used to capture the full visuals, even one surpassing by far those presently existing.

Quality and Resolution of Hybrid Film and Digital Cameras

In a further embodiment a hybrid film and digital cameras are provided wherein the media is configured in tandem for the purpose of capturing visuals with the visual quality of film and with a resolution amount of visual information surpassing conventional image capture utilized today:

A film camera capturing a visual through a single lens, which is "split", visually fragmented by a beam splitter of other lens-light diverting/dividing means, remains in the conventional film configuration of film stock and magazine containment. With regards to a 35 mm motion picture camera, such as PanaVision units, this means a magazine positioned on top of the camera, film which is delivered vertically to a gate for exposure and returned to the "take up" reel of the film magazine containment.

What is altered in the present configuration, related selectively to the optics and/or gate, or exposure area, of the film camera. Further, the digital or electronic picture capture aspect of the hybrid camera is high definition digital, with image quality similar to that of digital cinema units, such as the Sony CineAlta camera.

Herein, selectively variable aspects of the optics occurring selectively after the lens image has been in part diverted to the digital capture unit, or other flickerless "video assist" aspect allowing for electronic capture of the lens image, focus a portion of the lens image only to the film plane, for film emulsion recording intermittently within the film gate. Selectively the digital visual capture may occur through a separate lens, or other stage of the single lens capture process, in this configuration however a portion of the lens image is diverted for digitizing prior to the secondary aspect/process of the present system method's optics. However, conventional "video assist" options, such as the relaying of the lens image during the intermittent motion of the film, when the film plane is not receiving the lens image, may be employed selectively herein, allowing for conventional flick-free digital capture to couple with selectively conventional film capture process.

The difference herein, toward the objective of increased capture resolution, involves the delivery of a selectively different portion of the lens image to the film plane, to subsequent unexposed portions of emulsion (moved into the gate intermittently, as is conventional. As with a "zoom lens" where focal changes deliver a selectively different portion of the total possible lens image or scene to the film plane, herein at a selectively conventional 24 fps, or slower rate, even 2 fps, for example, selectively different portions of the overall lens image are delivered automatically to the film for recording, frame after frame. For example, in a simple configuration of the present invention, an image being originally captured at a given focal setting is delivered by lens optics toward the film plane for recording. Herein, selectively variable and/or moving optical elements, provide an amplification of what would have been the normal visual headed for the film plane, providing selectively half of the full lens image to the 35 mm film plane, and then after intermittent transport of the film to the next portion of unexposed motion picture film, selectively the other half of the lens image is provided to the gate and film plane for recording.

In this system and method, instead of a single lens visual being recorded at one instant onto a selected piece of emulsion, the lens image is delivered in stages two in this example to separate pieces of emulsion, allow for distinctly different recorded visuals to occur within two sequential frames of film emulsion, overlapping in visual content. Herein, digital means or other means, may be employed in post production to create a single visual, representative of the full lens image (delivered to these variable optic aspects, or other electronic image delivery and varying means,) from the sequential film frames.

What is gained, herein, is visual quality. When a widescreen cinematic visual is initially recorded by a 35 mm camera, for example, the emulsion available for the visual is limited by the width of the film stock. Typically, in a camera not anamorphically altering the scene captured, the wide visual occupies less film emulsion, than even a typical filmed television show capture means; this is because the ratio of the display means for a television show is more "square" allowing for more of the "4 perf" emulsion area to be utilized in capturing a single visual. Thus, ironically, significantly less emulsion is used per original scene/image area, when capturing a visual for a large screen display means, such as a 1:85 to 1 cinema screen, than is used when capturing a visual for a small screen (1:33 to 1) television display intent.

The entire emulsion surface area found within 4 perforations (vertically) of 35 mm film, may be utilized in recording a selected portion of the lens visual that would have been delivered in it's entirety to a single frame of film. So, in one example, the variable optics may provide 12 or less representation of the "left side" of the lens image that would be have been recorded on a single frame of film, and 12 or less representative of the "right side" of said lens image. Thus, in this example, a visual of as wide or wider than the cinema screen ration 2:35 to 1, may be captured within two subsequent frames of 35 mm motion picture film, providing a final visual, if the "sides" are married in digital post production, for such wide screen display means stored initially within an overall emulsion surface area many fold that which would have been utilized in capturing such a lens image, conventionally. This affects image quality.

Further, not being limited to horizontal, or left to right, partitions of lens images, sophisticated variable optic means may provide, for example, 12 separate portions of a lens image, or less, or more, with portions of the lens image coming from different areas both horizontally and vertically within the original lens image. Such a capture system then provides, from a single second of recording for example, 24 frames of high definition, or regular definition, digital visuals captured by the electronic capture aspect of the hybrid camera, such as the well known "video assist" aspect, and 24 frames of 35 mm picture film, wherein selectively the configuration capturing two frames of 4 perf visuals for each overall framed scene visual, resulted in a visual quality, e.g. emulsion, more like 70 mm film capture. In a scenario where in 12 frames of film, if running at 12 fps, wherein a selectively unique portion of the lens image is delivered to each frame, an imaging result may exceed any currently known approach to capturing images for entertainment.

In that scenario, the mosaic of captures from portions of the overall image, provides a final emulsion surface area, per visual, that is enormous; in essence, as large as all 12 frames' recording area pasted together, more like still photography's 2¼" negatives.

In post production, by way of existing morphing technology and selective digital replacement means, the digital images or video captured may selectively provide all of the image elements' positioning data necessary to apply the filmed image, once assembled as one, digitally for example, per second, to the 24 frame of originated digital material. As a result, for future display, and current very high resolution display means, the large "key frames" of data, created by different subsequent frames of film that in tandem represent a single "scene" being photographed, provide all of the original visual data necessary for display systems of the future, that may exceed even 30 k, for example.

In one aspect of the invention is disclosed a relatively unchanged camera configuration, with optics including means to isolate distinct portions of a scene, through a lens, for subsequent recording on a film stock. When digital assembled, and selectively utilizing conventional digital visuals originated of the full scene framed, the image "portions" recorded on film provide an increased emulsion recording size of a selected amount, for selective digitizing and assemblage, in association with the digitally originated material, or not.

In a further aspect, 24 frames of digital material captured, may be selectively applied to the extremely high resolution overall visual resulting from (even 24) distinct 35 mm frames representative of a single "scene" framed by the cinematographer. Therein, though somewhat absurd at the present, perhaps less so in the future, morphing and image aspect repositioning means may provide post production software to allow those 24 distinct captures from a single scene to result in 24 frames of the full scene, provide by the full frame original digital captures, with the potentially more than 6 k of data per film frame resulting in 24 overall frames of motion media, each and every of those 24 frames containing potentially over 140 k of data.

Though the uses for 140 k images may be limited today, the availability of the ability to extract such image quality from entertainment projects shot today may affect such projects' compatibility and use in the future—wherein projects limited to 4 k, for example, may be less desirable for systems and audiences geared to much higher quality future systems of viewing.

Again, in the simplest configuration, a single 2:35 to 1 ratio visual, for example, may be captured within 24 frames of 35 mm emulsion as 12"left side" portions of the framed scene, and 12 "right side" portions, (recorded in staggered order, left, right, left, right, selectively.

24 frames of video material captured in tandem with said filmed images, even "video assist material", may be referenced or employed in allocating the "sides" of filmed visual data, once digitized for example, to assemble 24 final digital images with selectively an image quality exceeding 12 k, and likely approaching 20 k, considering the efficient use of the 4 perf emulsion area.

In essence, the 35 mm cameras of today may provide approximately 70 mm originated cinema images, meaning images similar to those captured with 65 mm or 70 mm "equipment" and film stock.

16 mm cameras, for example, with the hybrid configuration, purpose and means herein, may provide final visuals well in excess of conventional 35 mm cameras today. And, in any gauge size, while selectively extending the recording time of the film media. For example, if a lens image or scene is captured on film as 6 distinct areas, or portions, totaling the full scene, that is 6 fps. So, the net effect is while increasing image quality by at least 6 times, over conventional 16 mm capture, the recording time of a single roll of film is quadrupled, as film is running at ¼ the normal frame rate; as film is capturing reference frames, while the digital aspect of the hybrid unit is capturing full frame visual data, including critical image data relating to the shifting or changing or repositioning of elements recorded during a single second, that may have been "missed" by the filmed frames.

Thus, digital technology allows for the higher resolution of the single assembled film frame, to not be compromised in repositioning those higher resolution "elements" relative to their counterparts within the digitally originated visuals. Thus, nothing is compromised in resulting in digital images, with the "look" of film, with virtually unlimited resolution and wherein film recording time is simultaneously extended dramatically.

Although the foregoing invention has been described in some detail by way of illustration and example for purposes of clarity of understanding, it will be readily apparent to one of ordinary skill in the art in light of the teachings of this invention that certain changes and modifications may be made thereto without departing from the spirit or scope of the appended claims.

What is claimed:

1. An imaging system, comprising:
   an electronic image capture module mounted within a housing of a camera and configured to capture high resolution images;
   a mechanism configured to position the electronic image capture module to capture high resolution images of different portions of a scene;
   a module configured to capture low resolution video corresponding to the scene and capture position and timestamp information for image aspects in the scene; and
   a computing device configured to:
     generate a high resolution composite image from captured high resolution images of different portions of the scene and captured position and timestamp information for the image aspects in the scene; and
     generate high resolution video of the scene from the high resolution composite image and the low resolution video.

2. The imaging system of claim 1, wherein said high resolution composite image embodies information captured by said electronic image capture module in the collection of high resolution images.

3. The imaging system of claim 1, wherein said mechanism comprises an electronic motor configured to move said electronic image capture module to capture the collection of high resolution images and return said electronic image capture module to a starting position after light indicative of the different portions of the scene has been individually captured.

4. The imaging system of claim 1, wherein the position and timestamp information is captured at a higher capture rate than a capture rate used to generate the collection of high resolution images.

5. The imaging system of claim 1, further comprising:
   a mechanism for rotating the electronic image capture module to change an aspect ratio for the high resolution images.

6. The imaging system of claim 5, wherein the mechanism for rotating the electronic image module is configured to intermittently rotate the electronic image capture module.

7. The imaging system of claim 1, wherein the module configured to capture low resolution video is configured to obtain position and timestamp information corresponding to time periods during which the electronic image capture module captures the high resolution images and moves to a new position.

8. The imaging system of claim 1, wherein light indicative of the scene is concurrently provided to said electronic image capture module and the module configured to capture low resolution video.

9. The imaging system of claim 8, wherein said module configured to capture low resolution video is further configured to generate a plurality of low resolution video images corresponding to time periods during which the electronic image capture module captures the high resolution images and moves to another position.

10. The imaging system of claim 1, wherein said module configured to capture low resolution video is configured to capture 24 full frame captures of the scene per second.

11. The imaging system of claim 1, further comprising:
an image diversion means for concurrently providing light indicative of the scene to the electronic image capture module and the module configured to capture low resolution video.

12. The imaging system of claim 1, wherein said computing device is configured to assemble at least of the two high resolution images different portions of the scene to form said high resolution composite image.

13. The imaging system of claim 1, wherein said high resolution video comprises a plurality of high resolution images configured to be displayed in rapid succession.

14. The imaging system of claim 1, further comprising:
storing time coding information for each high resolution image in the collection of high resolution images.

15. The imaging system of claim 1, wherein the module configured to capture low resolution video is further configured to obtain position information from wire-frame information.

16. The imaging system of claim 1, wherein said computing device is further configured to store the position and timestamp information for objects in the scene and the collection of high resolution images and send the position and time information and the collection of high resolution images over a network.

17. The imaging system of claim 1, further comprising:
a second electronic image capture module configured to capture the low resolution video.

18. A camera comprising:
an image capture device configured to generate high resolution images of different portions of a lens image of a scene such that a high resolution composite image can be generated based on the collection of high resolution images;
a movable optical element configured to sequentially direct the different portions of the lens image to the image capture device;
a module configured to generate low resolution video corresponding to the lens image such that position and time information for objects in the lens image can be determined; and
a transfer mechanism configured to send generated high resolution images and generated low resolution video to a system, wherein the generated high resolution images and the generated low resolution video are configured to allow the system to generate high resolution video from at least the generated high resolution images, the generated low resolution video, and generated high resolution composite images.

19. The camera of claim 18, wherein said image capture device is configured to receive and capture the different portions of the lens image.

20. The camera of claim 18, wherein said movable optical element is a mirror.

21. The camera of claim 18, wherein said movable optical element is a lens.

22. The camera of claim 18, wherein said image capture device further comprises at least one imaging module within an image capture target zone, said at least one imaging module remaining static relative to said movable optical element.

23. The camera of claim 22, wherein said at least one imaging module is an electronic image capture and data relaying device.

24. The camera of claim 18, wherein the image capture device is a camera chip component operable to receive the different portions of the lens image and create a storable and readable electronic information representation of the generated high resolution images.

25. The camera of claim 18, wherein said different portions of the lens image are sequentially directed to at least one capture module in said image capture device, wherein said image capture device is configured to generate high resolution images at a configurable frame rate.

26. The camera of claim 18, wherein said movable optical element is further configured to move intermittently to provide a static period for image portion capture by the image capture device.

27. The camera of claim 18, wherein a motion of said optical element motion is at least in part a tandem function of a location changing motion imposed on the image capture device.

28. The camera of claim 18, further comprising:
an image diversion component configured to relay light indicative of the lens image to the module configured to generate low resolution video in tandem with relaying the light indicative of the lens image to the movable optical element.

29. The camera of claim 18, wherein said movable optical element is configured to enlarge said lens image prior to sequentially directing said different portions of the lens image.

30. The camera of claim 29, wherein a focal length associated with the movable optical element is selectable and dependent on a quantity of the high resolution images in the collection of high resolution images.

31. The camera of claim 30, wherein the focal length is varied as a function of the quantity of the high resolution images.

32. The camera of claim 29, wherein said movable optical element affects a focal length variation of said lens image.

33. The camera of claim 18 wherein said collection of high resolution composite images comprises more data than any individual high resolution image of the collection.

34. A non-transitory computer readable storage medium comprising:
instructions for generating at least one high resolution composite image based on high resolution images of different portions of a scene and position and time information for objects in the scene; and
instructions for generating high resolution video of the scene from at least the high resolution composite image and low resolution video corresponding to the scene.

35. The non-transitory computer of readable storage medium of claim 34, further comprising: instructions for receiving the position and time information.

36. The non-transitory computer readable storage medium of claim 35, wherein said position and time information is generated at least at 24 times per second.

37. The non-transitory computer storage readable medium of claim 35, further comprising:
instructions for receiving the position and time information from an electronic image capture module.

38. The non-transitory computer readable storage medium of claim 35, further comprising:
instructions for receiving the high resolution images from a camera configured to generate the high resolution images at a frequency set by a user of the camera.

39. A non-transitory computer readable storage medium comprising:
instructions for generating at least one high resolution composite image based on high resolution images; and instructions for forming high resolution video of a scene from the high resolution composite image and low resolution video corresponding to the scene;

wherein the high resolution composite image includes more image detail than at least one high resolution image in the plurality of high resolution images of different portions of the scene.

40. A camera, comprising:
a housing;
a lens integrated within the housing, the lens configured to receive light indicative of an image of a scene and relay the light to an image capture zone that includes an electronic image capture module;
a component configured to move the position of the electronic image capture module in the image capture zone to capture different portions of the light indicative of the image to generate high resolution images of the different portions of the scene;
a module configured to generate low resolution video corresponding to the image such that position and time information for objects in the image can be determined;
a data transfer mechanism configured to send generated high resolution images of different portions of the scene and generated low resolution video to a computer system, wherein the generated high resolution images and the generated low resolution video are configured to allow the computer system to generate a composite image of the scene from the generated high resolution images and generate high resolution video from the high resolution composite image and the generated low resolution video, wherein the high resolution composite image includes more image detail than at least one of the generated high resolution images.

41. The camera of claim 40, wherein the high resolution composite image embodies information captured by said electronic image capture module.

42. The camera of claim 40, further comprising:
an electronic motor capable of moving said electronic image capture module.

43. The camera of claim 42, wherein the number of high resolution images in the collection is variable and selectable.

44. A camera comprising:
an electronic image capture device;
an optical assembly configured to receive light indicative of a scene and sequentially relay different portions of the light indicative of the scene to the electronic image capture device, wherein the electronic image capture device is configured to generate high resolution images of different portions of the scene;
a module configured to generate low resolution video corresponding to the scene such that position and time information for objects in the scene can be determined;
a data transfer mechanism configured to send generated high resolution images and generated low resolution video to a computer system, wherein the generated high resolution images and the generated low resolution video are configured to allow the computer system to generate a high resolution composite image of the scene from at least the generated high resolution images and generate high resolution video from the generated high resolution composite image and the low resolution video, wherein the high resolution composite image includes more image detail than at least one of the generated high resolution images.

45. The camera of claim 44, further comprising:
means for relaying the light indicative of the scene to the optical assembly and to a secondary electronic image capture device configured to sample and determine the position and time information for objects in the scene.

46. A system comprising:
a position variable image capture module configured to be movable around an image capture zone to sequentially capture high resolution images of distinct portions of a scene; and
a computing device configured to generate high resolution video from a high resolution composite image generated from captured high resolution composite images and low resolution video corresponding to the scene.

47. A system comprising:
at least one position variable optical component configured to sequentially relay distinct portions of light indicative of a scene to a stationary electronic image capture module configured to generate high resolution images of distinct portions of the image; and
a computer system configured to generate a plurality of high resolution composite images from captured high resolution images and generate high resolution video from at least the plurality of high resolution composite images and low resolution video corresponding to the scene.

48. A system comprising:
an optical component configured to sequentially relay distinct portions of light indicative of a scene to an image capture zone;
an image capture module configured to capture the distinct portions of light received in the image capture zone and generate high resolution composite images of distinct portions of the scene, the high resolution composite images comprising a plurality of high resolution images,
a computer system configured to generate high resolution video from the high resolution composite images and low resolution video corresponding to the scene.

49. A method for capturing images comprising:
directing a first portion of light indicative of a first portion of a scene to an electronic image capture device;
capturing, by the electronic image capture device, a first high resolution image from the first portion of the light;
directing a second portion of the light indicative of a second portion of the scene to the electronic image capture device;
capturing, by the electronic image capture device, a second high resolution image from the second portion of the light;
capturing low resolution video corresponding to the scene such that position and time information for objects in the image can be determined;
sending the first high resolution image, the second high resolution image, and the low resolution video to a computer, wherein the first high resolution image, the second high resolution image, and the low resolution video are configured to allow the computer to generate high resolution video of the scene from a high resolution composite image derived from the first and second high resolution images and low resolution video corresponding to the scene.

50. The method of claim 49, wherein said directing the first portion and said directing the second portion are performed by a movable optical element.

51. The method of claim 49, further comprising:
determining position information for objects in the scene.

52. The method of claim 51, further comprising:
repositioning the movable optical element to change the aspect ratio for the first high resolution image and the second high resolution image.

53. The method of claim 49, further comprising:
capturing, by a second electronic image capture device, the light indicative of the image at a capture rate greater than the capture rate used by the electronic image capture device.

54. The method of claim 49, wherein the high resolution composite image is a key frame.

55. The method of claim 53, wherein the light indicative of the image is concurrently provided to the first and second electronic image capture devices.

56. A computer implemented method for generating high resolution video comprising:
determining position and time information for identifiable elements objects in a scene; and
generating, on the computer, high resolution video corresponding to the scene from at least a high resolution composite image derived from a plurality of high resolution images representative of the scene, low resolution video corresponding to the scene, and the position and time information.

* * * * *

UNITED STATES PATENT AND TRADEMARK OFFICE
CERTIFICATE OF CORRECTION

| | | |
|---|---|---|
| PATENT NO. | : 7,864,211 B2 | Page 1 of 1 |
| APPLICATION NO. | : 11/549937 | |
| DATED | : January 4, 2011 | |
| INVENTOR(S) | : Mowry | |

It is certified that error appears in the above-identified patent and that said Letters Patent is hereby corrected as shown below:

Title page, item (56), under "Other Publications", in Column 2, Line 2, delete "Internaitonal" and insert -- International --.

Column 37, line 7, in Claim 12, after "at least" delete "of the".

Column 37, line 8, in Claim 12, after "images" insert -- of the --.

Column 38, line 49, in Claim 35, after "computer" delete "of".

Column 38, line 55, in Claim 37, delete "storage readable" and insert -- readable storage --.

Signed and Sealed this
Thirty-first Day of May, 2011

David J. Kappos
*Director of the United States Patent and Trademark Office*